(12) United States Patent
Grossman et al.

(10) Patent No.: US 10,865,336 B2
(45) Date of Patent: Dec. 15, 2020

(54) POLYMER BASED SOLID-STATE SOLAR THERMAL FUELS

(71) Applicant: MASSACHUSETTS INSTITUTE OF TECHNOLOGY, Cambridge, MA (US)

(72) Inventors: Jeffrey C. Grossman, Brookline, MA (US); David Zhitomirsky, Cambridge, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

(21) Appl. No.: 16/060,944

(22) PCT Filed: Dec. 11, 2016

(86) PCT No.: PCT/US2016/066043
§ 371 (c)(1),
(2) Date: Jun. 10, 2018

(87) PCT Pub. No.: WO2017/100727
PCT Pub. Date: Jun. 15, 2017

(65) Prior Publication Data
US 2018/0355234 A1    Dec. 13, 2018

Related U.S. Application Data

(60) Provisional application No. 62/265,587, filed on Dec. 10, 2015.

(51) Int. Cl.
| | |
|---|---|
| *C09K 5/14* | (2006.01) |
| *F24S 60/20* | (2018.01) |
| *F24S 60/00* | (2018.01) |
| *F24S 80/20* | (2018.01) |
| *F24S 21/00* | (2018.01) |
| *F28D 20/00* | (2006.01) |

(52) U.S. Cl.
CPC .............. *C09K 5/14* (2013.01); *F24S 21/00* (2018.05); *F24S 60/00* (2018.05); *F24S 60/20* (2018.05); *F24S 80/20* (2018.05); *F28D 20/003* (2013.01); *Y02E 10/40* (2013.01)

(58) Field of Classification Search
None
See application file for complete search history.

(56) References Cited

U.S. PATENT DOCUMENTS

| | | |
|---|---|---|
| 2012/0325200 A1 | 12/2012 | Kolpak et al. |
| 2015/0162555 A1 | 6/2015 | Wu et al. |

OTHER PUBLICATIONS

Preliminary Report on Patentability for Application No. PCT/US2016/066043 dated Jun. 12, 2018.
Written Opinion of the International Searching Authority and International Search Report dated Jun. 15, 2017 in PCT/US2016/066043.
Anders Lennartson et al: "Designing photoswitches for molecular solar thermal energy storage", Tetrahedron Letters, vol. 56, No. 12, Mar. 1, 2015 (Mar. 1, 2015), pp. 1457-1465.
Toru Ube et al: "Photomobile Polymer Materials with Crosslinked Liquid-Crystalline Structures: Molecular Design, Fabrication, and Functions", Angewandte Chemie International Edition, vo 1. 53, No. 39, Sep. 22, 2014 (Sep. 22, 2014), pp. 10290-10299.
David Zhitomirsky et al: "Solid-State Solar Thermal Fuels for Heat Release Applications", Advanced Energy Materials, vol. 6, No. 6, Dec. 23, 2015 (Dec. 23, 2015), p. 1502006.
David Zhitomirsky et al: "Conformal Electroplating of Azobenzene-Based Solar Thermal Fuels onto Large-Area and Fiber Geometries". ACS Applied Materials and Interfaces. vol. 8. No. 39. Oct. 5, 2016 (Oct. 5, 2016). pp. 26319-26325.
Feng, W. et al., J. Mater. Chem. A, 4, 8020 (2016).
Feng, W. et al., Sci. Reports, 3, 3260 (2013).
Han, G.D., et al, J. Mater. Chem. A, 4, 16157 (2016).
Luo W. et al, J. Mater. Chem. A, 3, 11787 (2015).
Zhitomirsky, D. et al, ACS Appl. Mater. Interfaces, 8, 201319-26325 (2016).~.
Zhitomirsky, D. et al, Adv. Energy Mater. 1502006 (2015).
"Photon Energy Storage Materials with High Energy Densities Based on Diacetylene-Azobenzene Derivatives," GD Han, SS Park, Y Liu, D Zhitomirsky, E Cho, M Dinca, JC Grossman, J. Mater. Chem. A, 2016, Advance Article.
"Templated Assembly of Photoswitches Significantly Increases the Energy-Storage Capacity of Solar Thermal Fuels," Timothy J. Kucharski, Nicola Ferralis, Alexie M. Kolpak, Jennie O. Zheng, Daniel G. Nocera and Jeffrey C. Grossman Nature Chemistry (2014).
Alexie M. Kolpak et al., "Azobenzene-Functionalized Carbon Nanotubes as High-Energy Density Solar Thermal Fuels," Nano Letters, vol. 11, No. 8, Jun. 20, 2011, pp. 3156-3162.
Sadowska et al. "Synthesis, characterization, and electrochemical testing of carbon nanotubes derivatized with azobenzene and anthraquinone" Carbon, 2009, vol. 47, pp. 1501-1510.
Feng Yiyu, et al., "Photoinduced anisotropic response of azobenzene chromophore functionalized multiwalled carbon nanotubes," Journal of Applied Physics, vol. 102, No. 5, Sep. 7, 2007, pp. 53102-53102.
Xuefeng Guo et al., "Directing and Sensing Changes in Molecular Conformation on Individual Carbon Nanotube Field Effect Transistors," Journal of the American Chemical Society, vol. 127, No. 43, Nov. 1, 2005, pp. 15045-15047.
Elisa del Canto et al., "Functionalization of single-walled carbon nanotubes with optically switchable spiropyrans," Carbon, vol. 48, No. 10, Aug. 1, 2010, pp. 2815-2824.

(Continued)

*Primary Examiner* — Joseph R Kosack
(74) *Attorney, Agent, or Firm* — Honigman LLP

(57) ABSTRACT

A polymer consisting of small functional molecules can be integrated into solar thermal fuels in the solid-state for solar energy harvesting and storage. In certain embodiments, a solar energy storage device can include one or more layers of photoswitchable moieties associated with a polymer. Such solar thermal fuel polymers can be used to enable deposition from low concentration solutions, resulting in uniform and large-area thin-films. This approach enables conformal deposition on a variety of conducting substrates that can be either flat or structured and control over film growth via electrodeposition conditions and results in highly uniform and large-area thin films.

33 Claims, 35 Drawing Sheets

(56) References Cited

OTHER PUBLICATIONS

Ipsita A. Banerjee et al., "Application of Host-Guest Chemistry in Nanotube-Based Device Fabrication: Photochemically Controlled Immobilization of Azobenzene Nanotubes on Patterned α-CD Monolayer/Au Substrates via Molecular Recognition," Journal of the American Chemical Society, vol. 125, No. 32, Aug. 1, 2003, pp. 9542-9543.

International Search Report and Written Opinion dated Sep. 5, 2012; International Application No. PCT/US2012/035379.

Ying et al. "Functionalization of Carbon Nanotubes by Free Radicals" Organic Letters, 2003, vol. 5, pp. 1471-1473.

Senadeera et al. "Synthesis of Triphenylamine Trisazo Dye and Study of its Uses in Dye Sensitized Solar Cells" Sri Lankan Journal of Physics, 2005, vol. 6, pp. 43-50.

Kucharski et al. "Templated assembly of photoswitches significantly increases the energy-storage capacity of solar thermal fuels" Nature Chemistry, 2014, vol. 6, pp. 441-447.

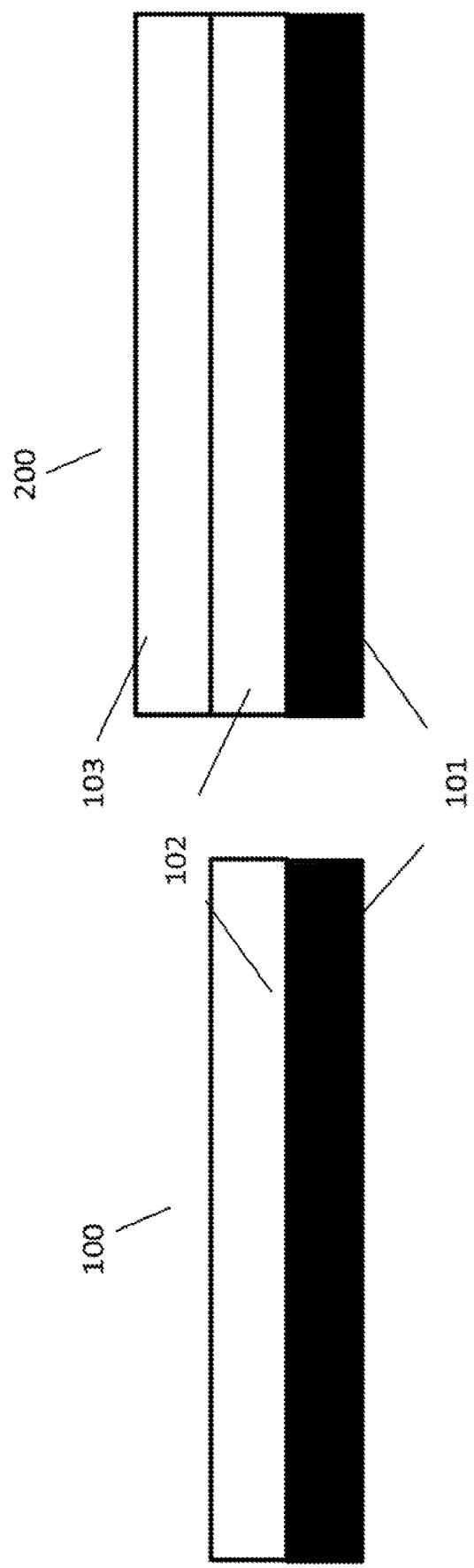

POLYMER BASED SOLID-STATE SOLAR THERMAL FUELS

CLAIM OF PRIORITY

This application claims the benefit under 35 USC 371 to International Application No. PCT/US2016/066043, filed Dec. 11, 2016, which claims the benefit of prior U.S. Provisional Application No. 62/265,587 filed on Dec. 10, 2015, each of which is incorporated by reference in its entirety.

TECHNICAL FIELD

This invention relates to energy storage materials, particularly solar thermal fuels, and methods of making and using them.

BACKGROUND

Solar energy is an abundant yet underexploited energy resources on Earth. Though several large-scale solar energy harvesting and storage solutions have been developed (such as large-area solar cells), there is tremendous opportunity for smaller-scale device applications for industrial and consumer use. Full utilization of the largest and most obvious source of renewable energy—the sun—requires advanced technologies for converting light into other useful forms of energy, as well as novel means for storing energy for convenient transport and on-demand use. One promising concept that has recently become the focus of renewed attention is that of solar thermal fuels, which store energy from the sun in photoactive molecules. Upon absorption of light energy, a photoactive molecule adopts a higher-energy metastable state. To release the energy stored in the higher-energy state, an external trigger (such as heat, light, voltage, or a chemical reaction) is applied. The fuel can subsequently be recharged by exposure to light; in principle, the entire operation can be repeated ad infinitum.

SUMMARY

In one aspect, an energy storage device can include a solar thermal fuel including one of more layers of a plurality of photoswitchable moieties associated with a first polymer, wherein the energy storage device is in solid state.

In another aspect, a method of storing cyclable energy can include providing an energy storage device comprising a solar thermal fuel including a plurality of photoswitchable moieties associated with a first polymer, wherein the energy storage device is in solid state, illuminating the plurality of photoswitchable moieties, thereby converting the photoswitchable moieties to from a lower-energy state to a higher-energy metastable state, storing the plurality of photoswitchable moieties in the higher-energy metastable state for a period of time, and providing a trigger to cause the plurality of photoswitchable moieties to revert to the lower-energy state. In certain circumstances, the method can include releasing heat.

In another aspect, a method of manufacturing an energy storage device can include providing a substrate, depositing a layer of a first polymer solution on the substrate, a plurality of photoswitchable moieties associated with the first polymer, and solidifying the layer. In certain circumstances, the method can include repeating depositing a layer of a first polymer solution on the substrate, a plurality of photoswitchable moieties associated with the first polymer and solidifying the layer. In certain circumstances, the method can include charging the device with UV illumination. In certain circumstances, solidifying can include UV curing. In certain circumstances, depositing can include tape-casting, drop-casting or spin-coating.

In certain embodiments, the plurality of photoswitchable moieties can be covalently linked to first polymer. The first polymer can be a polyolefin, a polyacrylate, or a polystyrene.

In certain embodiments, the plurality of photoswitchable moieties can include a plurality of azobenzene moieties, a plurality of stilbene moieties, a plurality of norbornadiene moieties, or a plurality of spiropyran moieties. For example, the plurality of azobenzene moieties can have formula (I):

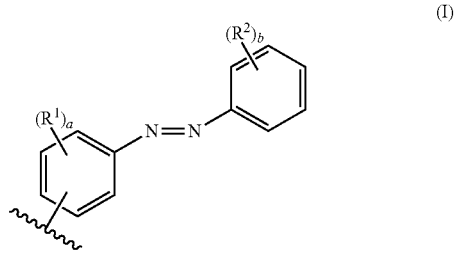

wherein:
each $R^1$, independently, is H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl; each $R^2$, independently, is H, halo, hydroxy, nitro, cyano, amino, alkylamino, dialkylamino, —$SO_3H$, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl; a is 0, 1, 2, 3 or 4; b is 0, 1, 2, 3, 4, or 5; and ┤- represents an optional covalent link to the first polymer.

In certain embodiments, the photoswitchable moieties can be converted from a lower-energy state to a higher-energy metastable state upon UV illumination. In certain circumstances, the photoswitchable moieties can be reverted from a higher-energy metastable state to a lower-energy state by a trigger. In certain embodiments, reverting from a higher-energy state to a lower-energy metastable state upon an external trigger can induce heat release. In certain embodiments, reverting from a higher-energy state to a lower-energy metastable state can include isomerization of the photoswitchable moieties.

In certain embodiments, the first polymer can be incorporated into a second polymer matrix. In certain embodiments, the first polymer and the second polymer can be crosslinked.

In certain embodiments, the second polymer can include an acrylate.

In certain circumstances, the thickness of the one or more layers can be between 100 nm and 100 µm.

In certain circumstances, the photoswitchable moieties can be functionalized.

In certain circumstances, a plurality of ionizable moieties can be associated with the first polymer.

In certain circumstances, wherein the ionizable moieties includes carboxyl groups.

In certain circumstances, the device can include a substrate, wherein the substrate is coated with the solar thermal fuel, which can include a binder. In certain circumstances, the substrate can include a conducting material. In certain circumstances, the substrate can include a metal wire. In certain circumstances, the metal wire can be incorporated into a fabric. In certain circumstances, the substrate can include indium tin oxide.

In certain circumstances, the first polymer solution further includes a second polymer, wherein the first polymer and the second polymer form crosslinks upon UV illumination.

In certain circumstances, depositing can include electrodeposition. The first solution can be dissolved in an electrolyte. The first solution can include water.

Other aspects, embodiments, and features will be apparent from the following description, the drawings, and the claims.

BRIEF DESCRIPTION OF THE DRAWINGS

FIG. 1A shows a schematic of an azobenzene polymer consisting of 4 monomers in the trans state being converted to the cis state upon UV illumination. FIG. 1B shows chemical synthesis scheme for generating the homopolymer by employing a radical polymerization of an azobenzene monomer. FIG. 1C shows size exclusion chromatography performed to analyze polymer samples and deduce the distribution, as well as reproducibility with a scaled-up synthesis.

FIG. 2A shows solution absorption spectra of the monomer and polymer exhibiting two prominent peaks. FIG. 2B shows eyring-polanyi plots used to extract the reverse thermal isomerization barrier energy associated with the discharge process. FIG. 2C shows cycling plots demonstrating the long-term cyclability of the two species to ascertain the feasibility for long-term material use.

FIG. 3A shows schematic of the spin-coating process employing the polymer solution in toluene with a transparent quartz substrate. FIGS. 3B and 3C show depict color-adjusted optical microscope images of the monomer and polymer spin-coated films respectively. FIG. 3D shows cross-sectional SEM image of the polymer film atop silicon exhibiting uniform thickness. FIG. 3E shows solid-state absorption spectra obtained on several samples with variable processing conditions based on polymer STF concentration in solution. FIGS. 3F and 3G show depict polymer film mass and thickness, respectively, for the processing conditions in FIG. 3E.

FIG. 4A shows differential scanning calorimetry traces for monomer and polymer charged under various conditions. FIG. 4B shows photo-charging of the polymer STF film visualized through absorption. FIG. 4C shows energy density measured on Solar Thermal Energy Capacitors charged in the solid-state as a function of time. FIG. 4D shows comparison of discharging the polymer STF samples in the dark between the solution and solid-state.

FIG. 5A shows cross-linking concept of the STF polymer film employing a hybrid solution of STF and cross-linker. FIG. 5B shows photograph of a freestanding, large area polymer STF film generated using the cross-linking approach. FIG. 5C shows molecular concept for the incorporation of the polymer STF into a cross-linked polyglycol diacrylate matrix. FIG. 5D shows charging properties of the polymer and hybrid films, as well as optical properties of cross-linked polyglycol diacrylate. FIG. 5E shows cross-sectional SEM image of a 3 layer-by-layer hybrid film where individual layers maybe resolved (dashed lines), exhibiting exceptional uniformity and adhesion between layers. FIG. 5F shows sheared hybrid film from FIG. 5E where 3 layers may be clearly resolved atop one another.

FIG. 6A shows top-view IR heat map of uncharged and charged Solar Thermal Energy Capacitors (STECs) placed on a heating element, with side-view illustration below. FIG. 6B shows average temperature recorded on the surface of each STEC plotted as a function of experiment time. FIG. 6C shows average temperature differences between the two STECs after normalization at the stabilization temperature around 160 s into the experiment.

FIG. 11A shows structures representing the solar thermal fuel and charging units. FIG. 11B shows Photograph depicting the solubility of various synthesized polymers based on solar thermal fuel:charging unit ratio. FIG. 11C shows concept of the electrodeposition scheme.

FIG. 12A shows optimized solar thermal fuel solid-state film deposited on stainless steel represented by the yellow coated portion. FIG. 12B shows discontinuous film formed as a result of lack of protons, necessitating the addition of a small amount of water to the solution. FIG. 12C shows effect of longer deposition times. FIG. 12D shows optical microscope image of boundary of film between the stainless steel and film region. FIG. 12E shows the film in FIG. 12D scratched near the center to ascertain smoothness based on contrast with the underlying electrode. FIG. 12F shows higher magnification image of the scratch at the interface, depicting a well-connected and continuous film.

FIG. 13A shows wire meshes with STF deposits on the lower edge represented by the yellow hue. FIG. 13B shows scanning electron microscopy image of the mesh with a thin STF coating conformably coating the wires. FIG. 13C shows image of the mesh with a thicker coating achieved by extending the deposition time.

FIG. 14A shows scanning electron microscopy cross-section image of an electrodeposited film on stainless steel. FIG. 14B shows scanning electron microscopy cross-section image of an electrodeposited film on a silicon substrate. FIG. 14C shows concept for a solar thermal fuel fiber where solar energy is stored within the fiber and released as heat into the wire to be carried off elsewhere within a functional device.

FIG. 14D shows proof-of-concept using an electrodeposited thick solar thermal fuel coating atop a 50 micron fiber depicting both the wire and the co-polymer coating.

FIG. 15A shows absorbance spectrum of the co-polymer electrodeposited solar thermal fuel film atop of conductive indium tin oxide/glass substrate. FIG. 15B shows scanning differential calorimetry carried out on the charged co-polymer, whereby the cis isomer is converted to the trans variant (depicted).

FIGS. 16A-16B show schematics of an energy storage device including a solid state solar thermal fuel.

DETAILED DESCRIPTION

Figure 1A:
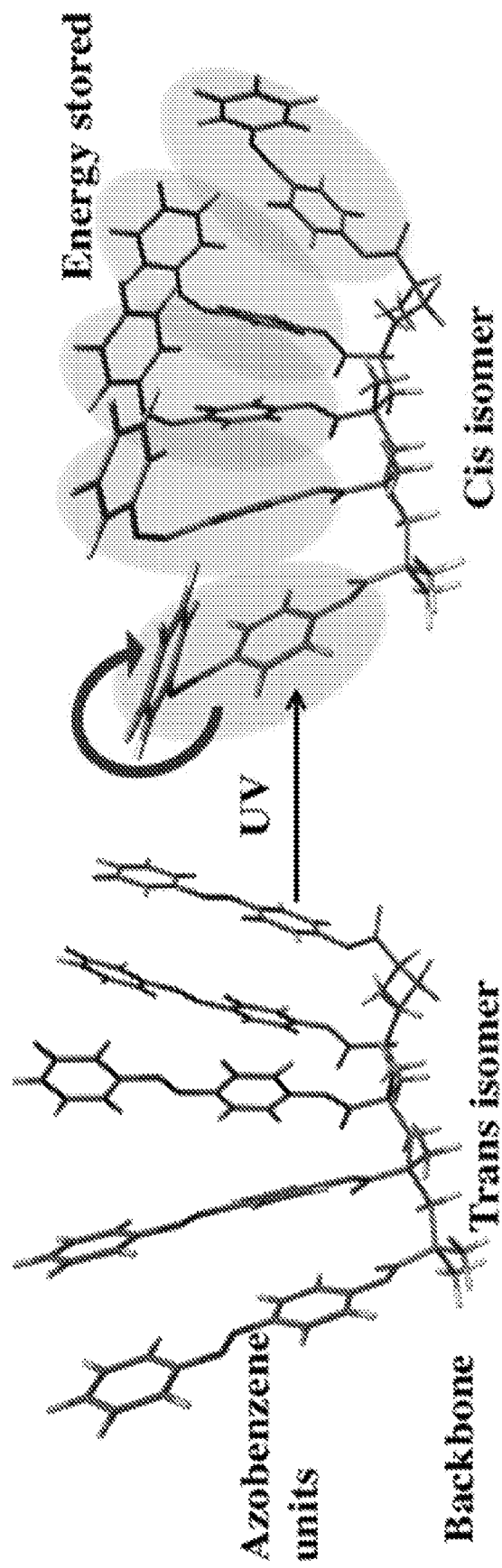
FIGS. 1A-1C shows solid-state solar thermal fuel polymer concept.

Closed cycle systems, such as ones employing cyclable energy storage within the bonds of organic chromophores, offer the unique advantage of energy harvesting and storage all within the same material. See, T. J. Kucharski, Y. Tian, S. Akbulatov, R. Boulatov, *Energy Environ. Sci.* 2011, 4, 4449, and A. Lennartson, A. Roffey, K. Moth-Poulsen, *Tetrahedron Lett.* 2015, 56, 1457, each of which is incorporated by reference in its entirety. Furthermore, in some applications, heat rather than electrical energy may be required, where these materials have their greatest potential.

The practical aspects of a Solar Thermal Fuel (STF) involve absorbing photons of energy sufficient to cause an electronic transition that then drives an isomerization or reversible chemical process. The isomerized, higher energy, state of a practical STF stores a substantial portion of this photon energy and has the necessary energetics to prevent substantial thermal reversion at storage conditions. Solution state STFs have been explored as large-scale energy storage materials given the norborodiene/quadricyclane system and its high energy density (~280 Whkg$^{-1}$). See. V. Gray, A. Lennartson, P. Ratanalert, K. Borjesson, K. Moth-Poulsen, *Chem. Commun.* 2014, 50, 5330, and V A Bren' and Alexander D Dubonosov and Vladimir I Minkin and V A Chernoivanov, *Russ. Chem. Rev.* 1991, 60, 451, each of which is incorporated by reference in its entirety. However, these materials were soon abandoned due to low cyclability, limiting long-term use. In other approaches, new materials with modest energy storage (56 Whkg$^{-1}$) employing ruthenium with higher cyclability have been developed, but remain prohibitively expensive for wide adoption. See, R. Boese, J. K. Cammack, A. J. Matzger, K. Pflug, W. B. Tolman, K. P. C. Vollhardt, T. W. Weidman, *J. Am. Chem. Soc.* 1997, 119, 6757, K. Börjesson, D. Ćoso, V. Gray, J. C. Grossman, J. Guan, C. B. Harris, N. Hertkorn, Z. Hou, Y. Kanai, D. Lee, J. P. Lomont, A. Majumdar, S. K. Meier, K. Moth-Poulsen, R. L. Myrabo, S. C. Nguyen, R. A. Segalman, V. Srinivasan, W. B. Tolman, N. Vinokurov, K. P. C. Vollhardt, T. W. Weidman, *Chem. —Eur.* 1 2014, 20, 15587, and Y. Kanai, V. Srinivasan, S. K. Meier, K. P. C. Vollhardt, J. C. Grossman, *Angew. Chem. Int. Ed.* 2010, 49, 8926, each of which is incorporated by reference in its entirety. With the availability of accurate computational tools, new approaches have leveraged carbon nanostructures and insights into the steric interaction of STFs to increase energy density employing highly cyclable and modest energy density (60-70 Whkg$^{-1}$) azobenzene derivatives. See, A. W. Adamson, A. Vogler, H. Kunkely, R. Wachter, *J. Am. Chem. Soc.* 1978, 100, 1298, and R. J. Corruccini, E. C. Gilbert, *J. Am. Chem. Soc.* 1939, 61, 2925, each of which is incorporated by reference in its entirety. While demonstrating a per-molecule increase in energy density via templating (see T. J. Kucharski, N. Ferralis, A. M. Kolpak, J. O. Zheng, D. G. Nocera, J. C. Grossman, *Nat Chem* 2014, 6, 441, which is incorporated by reference in its entirety), these approaches require complex multi-step reactions, have low yields, and the resulting material has low solubility in most organic solvents (<1 gL$^{-1}$). More recently, it was possible to develop liquid azobenzene fuels at room temperature by attaching bulky ligands to the molecule (see K. Masutani, M. Morikawa, N. Kimizuka, *Chem. Commun.* 2014, 50, 15803, which is incorporated by reference in its entirety), and with several computational works detailing the possibility of increasing its energy density through functionalization of the benzene rings (see Y. Liu, J. C. Grossman, *Nano Lett.* 2014, 14, 7046, which is incorporated by reference in its entirety), this platform holds much promise for future STF developments. Despite such rapid progress in STF materials, solid-state platform and related applications have remained largely unexplored, with only recent studies on semi-solid photoliquefiable ionic crystals reaching energy densities of 35 Whkg$^{-1}$. See K. Ishiba, M. Morikawa, C. Chikara, T. Yamada, K. Iwase, M. Kawakita, N. Kimizuka, *Angew. Chem. Int. Ed.* 2015, 54, 1532, which is incorporated by reference in its entirety. Transitioning fully to the solid-state can offer the possibility of integrating STF materials into a multitude of existing solid-state devices such as coatings for deicing, or applications such as solar blankets and other consumer oriented heating equipment.

If properly engineered on the molecular level, STF materials can be controllably tailored within the solid-state. However, until now, there has not been an efficient method to accomplish this. For one, the most recent STF reports have relied on carbon scaffolds that simultaneously increase synthesis complexity, cannot be deposited into uniform films, contribute to the optical density without resulting in photo-charging, and introduce uncontrollable morphological effects that may limit charging and reversible switching in the solid state. See T. J. Kucharski, N. Ferralis, A. M. Kolpak, J. O. Zheng, D. G. Nocera, J. C. Grossman, *Nat Chem* 2014, 6, 441, W. Luo, Y. Feng, C. Cao, M. Li, E. Liu, S. Li, C. Qin, W. Hu, W. Feng, *J. Mater. Chem. A* 2015, 3, 11787, and T. A. Singleton, K. S. Ramsay, M. M. Barsan, I. S. Butler, C. J. Barrett, *J. Phys. Chem. B* 2012, 116, 9860, each of which is incorporated by reference in its entirety. Similarly, single-molecule thin films do not make homogenous layers, can often result in crystallization, and melt at low temperatures (~70° C. for azobenzene) thus limiting their utility in the solid-state. Azobenzene-based materials in solid-state applications for miscroswitches, microactuators, and sensors have been explored. See, X. Cheng, Q. Li, C. Li, J. Qin, Z. Li, *Chem.—Eur. J.* 2011, 17, 7276, G. K. Joshi, K. N. Blodgett, B. B. Muhoberac, M. A. Johnson, K. A. Smith, R. Sardar, *Nano Lett.* 2014, 14, 532, V. Ferri, M. Elbing, G. Pace, M. D. Dickey, M. Zharnikov, P. Samori, M. Mayor, M. A. Rampi, *Angew. Chem.* 2008, 120, 3455, G. Haberhauer, C. Kallweit, *Angew. Chem. Int. Ed.* 2010, 49, 2418, T. Ube, T. Ikeda, *Angew. Chem. Int. Ed.* 2014, 53, 10290, and S. Kobatake, S. Takami, H. Muto, T. Ishikawa, M. Irie, *Nature* 2007, 446, 778, each of which is incorporated by reference in its entirety.

In general, a solar thermal fuel stores light energy in the form of chemical bonds and subsequently releases that energy for practical work. Upon absorption of light with energy hv, a photoactive "fuel" molecule undergoes a conformational change or reaction to a higher energy metastable state, thus storing energy ΔH. An external trigger (e.g., heat, light, voltage, or a chemical reaction) is applied, providing energy to overcome the thermal barrier, $E_a$, and releasing a net energy of ΔH per molecule.

Closed cycle systems offer an opportunity for solar energy harvesting and storage all within the same material. Photon energy is stored within the chemical conformations of molecules, and is retrieved by a triggered release in the form of heat. Until now, such Solar Thermal Fuels (STFs) have been largely unavailable in the solid-state.

An ideal material class to form solid state STF coatings would need to 1) form smooth films with controllable thickness, 2) be resilient at high temperatures, 3) preserve the heat release properties of the molecular STF counterparts and maximize the energy density, 4) enable charging, storage and discharging on device-relevant timescales, and 5) exhibit feasibility for large area heat release applications. In this regard, a polymer solid-state platform was developed that, if engineered correctly, would be sufficiently tunable and scalable to satisfy these requirements. Importantly, the rich chemistry available on both the monomer and polymer backbone enables the application of the same computational design principles previously employed for single molecule STFs (see Y. Liu, J. C. Grossman, *Nano Lett.* 2014, 14, 7046, which is incorporated by reference in its entirety), while also revealing a newly accessible engineering space given polymer-polymer chain interaction, cross-linking degree, and conjugation within the polymer backbone.

Disclosed herein is an energy storage device including a solar thermal fuel including one of more layers of a plurality of photoswitchable moieties associated with a first polymer, where the energy storage device is in solid state. The association can be a covalent bond, an ionic bond, a polar interaction or other force holding the components together. FIG. 16A shows a schematic of an energy storage device 100 including a substrate 101 and a single layer 102 of photoswitchable moieties associated with a first polymer. In certain embodiments, an energy storage device can have a multiple layers of photoswitchable moieties associated with a first polymer. A non-limiting example an energy storage device 200 with two layers 102 and 103 of photoswitchable moieties associated with a first polymer is shown in FIG. 16B. The number of layers can be as many as necessary. The plurality of photoswitchable moieties can be covalently linked to first polymer. The photoswitchable moieties can be converted from a lower-energy state to a higher-energy metastable state upon UV illumination. The photoswitchable moieties can be reverted from a higher-energy metastable state to a lower-energy state by a trigger. Undergoing a higher-energy state to a lower-energy metastable state can include isomerization of the photoswitchable moieties, which induces heat release. The first polymer can be incorporated into a second polymer matrix. A plurality of ionizable moieties can be associated with the first polymer. The photoswitchable moieties can be functionalized.

In certain embodiments, photoswitchable moieties can include azobenzene moieties. A photoswitchable azobenzene moiety can have formula (I):

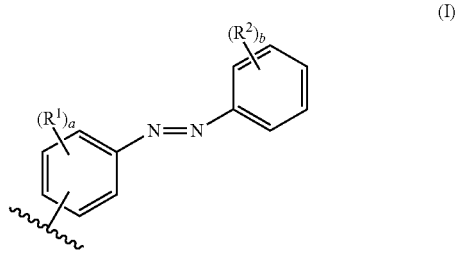

(I)

In formula (I), each $R^1$, independently, can be H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl. Each $R^2$, independently, can be H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)-cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a can be 0, 1, 2, 3 or 4; b is 0, 1, 2, 3, 4, or 5; and ⌇- can represent an optional covalent link to a polymer backbone.

Azobenzenes are a well studied class of photoswitchable moieties. See, e.g., Halabieh, R. H. E.; et al., *Pure Appl. Chem.* 2004, 76, 1445-65, which is incorporated by reference in its entirety. Other photoswitchable moieties include stilbene, norbornadiene-quadricyclane, and spiropyran-merocyanine.

While several reports have employed azobenzenes as part of the polymer backbone (see D. H. Wang, J. J. Wie, K. M. Lee, T. J. White, L.-S. Tan, *Macromolecules* 2014, 47, 659, and C. Weber, T. Liebig, M. Gensler, L. Pithan, S. Bommel, D. Bléger, J. P. Rabe, S. Hecht, S. Kowarik, *Macromolecules* 2015, 48, 1531, each of which is incorporated by reference in its entirety), an approach with more conformational freedom was chosen where azobenzene moieties comprised the polymer side-chains while simultaneously maximizing the azobenzene density in the form of homopolymers. See S. Fu, Y. Zhao, *Macromolecules* 2015, M. Petr, P. T. Hammond, *Macromolecules* 2011, 44, 8880, and Z. Li, Y. Zhang, L. Zhu, T. Shen, H. Zhang, *Polym. Chem.* 2010, 1, 1501, each of which is incorporated by reference in its entirety. FIG. 1A depicts such a polymer, where the backbone is comprised of an alkyl chain (e.g., a polyolefin) while the side chains are made up of azobenzenes. The result is the apparent rotation of that azobenzenes about the N═N double bond. When illuminated with photons of an appropriate energy, the low energy trans-azobenzene molecules would ideally change their conformation to the cis state, despite any steric effects resulting from neighboring side-chain interactions.

Figure 1C:
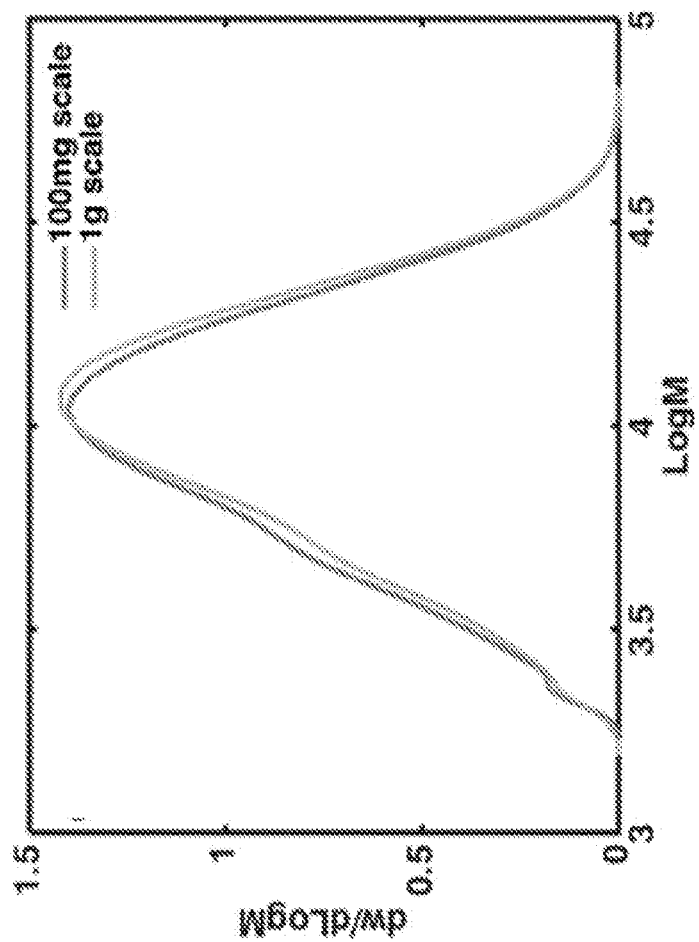
Figure 1B:
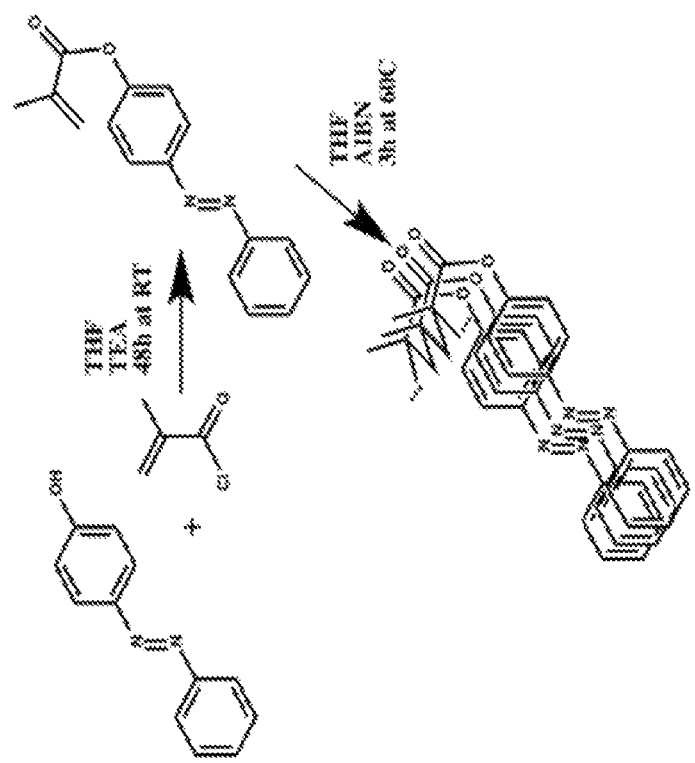

In certain embodiments, a monomer along with a synthetic route can be as shown in FIG. 1B, where an acrylate group is attached to an azobenzene derivative to enable polymerization with common radical initiators. Given that adding new functional groups can drastically change the energetic and optical properties of azobenzenes (see Y. Liu, J. C. Grossman, *Nano Lett.* 2014, 14, 7046, and A. A. Beharry, O. Sadovski, G. A. Woolley, *J. Am. Chem. Soc.* 2011, 133, 19684, each of which is incorporated by reference in its entirety), the intended monomer was first verified via density functional theory (DFT). DTF simulations revealed a modest potential energy density of 68 Whkg$^{-1}$ for the monomer species, indicating the additional substituent had not caused a major change in the expected energy density compared to azobenzene (76 Whkg$^{-1}$ from DFT).

Size exclusion chromatography on the synthesized polymer (FIG. 1C) enabled us to estimate of an average of 45 monomer units per polymer chain (referenced to polystyrene), and reproducibly scaled to the gram scale with an overall reaction yield of approximately 60%. Despite a high probability for steric hindrance during synthesis, these polymers grow to sufficiently large sizes, and are capable of being dissolved in organic solvents compatible with spin coating in order to make solid-state thin films. Additionally, generating these materials in a facile 2-step chemical process presents an attractive avenue towards scalability and inexpensive production. See T. P. Osedach, T. L. Andrew, V. Bulovic, *Energy Environ. Sci.* 2013, 6, 711, which is incorporated by reference in its entirety.

Figure 2A:
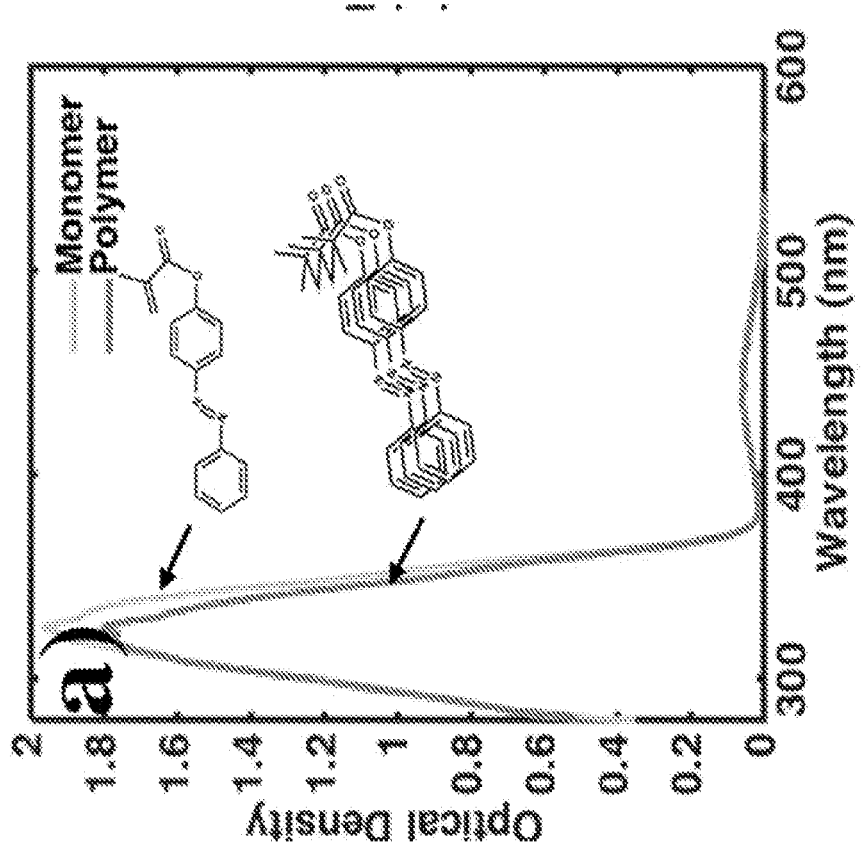
FIGS. 2A-2C show monomer and polymer properties.
Figures 2B, 2C:
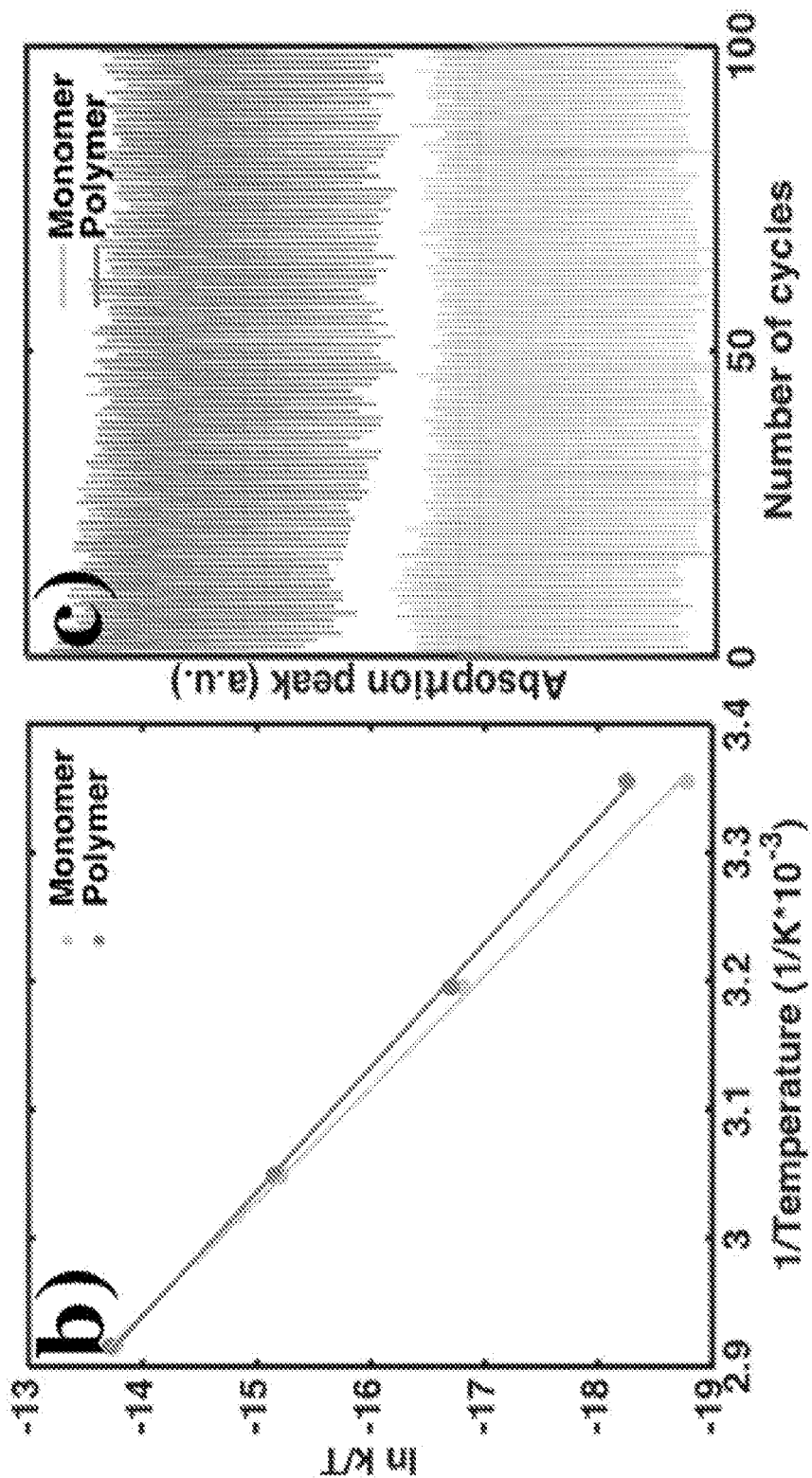

The key aspect of effective materials design relies in leveraging the excellent properties of certain small molecule STFs and transitioning them into the solid-state in the form of polymers. In this respect, it is important to compare the monomer and polymer moieties to ensure retention of STF properties. Absorption spectra (FIG. 2A) revealed consistent optical properties between the two materials, with a slight reduction in absorption in the pohirktr. Similar to azobezene, the trans-dominant peak exists in the UV at 325 nm, while the cis-state develops an optically accessible peak at 450 nm. The high-energy peak at 325 nm corresponds to the $\pi > \pi^*$ transition enabling trans to cis isomerization. As has been extensively reported for azobenzene (see H. Rau, *Photoisomerization of azobenzenes*; CRC Press: Boca Raton, Fla., 1990; Vol. 2, which is incorporated by reference in its entirety), exciting these materials via the $\pi > \pi^*$ transition results in the reduction of the high-energy peak and emergence of the low energy peak. The magnitudes of these peaks play a crucial role in the extent to which solid-state films of the polymer may be charged. In FIG. 2B, an Eyring-Polanyi plot (FIG. 7) enables to extract the reverse isomerization energy barrier often denoted as Ea, for the monomer (95 kJ/mol) and polymer (86±kJ/mol). Taken together with entropic considerations (FIGS. 5A-5F and Table 1), this results in charged-state half-lives on the scale of 50-100 hours making them suitable for energy storage in applications requiring daily cycles.

Figure 7:
FIG. 7 shows absorption peak recovery at various temperatures.

In FIG. 7, the monomer and polymer were charged using a 365 nm UV lamp (mercury bulb) close to the photostationary state. Both the monomer and polymer have an absorption max at ~325 nm, but the width of the absorption peak is wide enough to accommodate a 365 nm photoswitch. The intensity of decay at 25 C, 40 C, 55 C and 70 C for the monomer and the polymer are plotted below. The curves were fit to the formula $\Delta OD = a (1 - b\ e^{-kt})$.

Eyring-Polanyi analysis follows using the following equation:

$$\ln\frac{k}{T} = \frac{-\Delta H^\ddagger}{R} \cdot \frac{1}{T} + \ln\frac{k_B}{h} + \frac{\Delta S^\ddagger}{R}$$

TABLE 1

Eyring-Polanyi analysis on solar thermal fuel materials

| Sample | k * 10^-6 (sec^-1) |
|---|---|
| Monomer 25 C. | 2.094 |
| Monomer 40 C. | 15.61 |
| Monomer 55 C. | 81.21 |
| Monomer 70 C. | 364.5 |
| Polymer 25 C. | 3.500 |
| Polymer 40 C. | 17.45 |

TABLE 1-continued

Eyring-Polanyi analysis on solar thermal fuel materials

| Sample | k * 10^-6 (sec^-1) |
|---|---|
| Polymer 55 C. | 85.38 |
| Polymer 75 C. | 377.9 |

Finally, in order to be suitable for long-term use, the cyclability of these materials was tested in FIG. 2C, where photon sources were used to cycle the materials between the trans and cis states; retention of the optical and thus material properties was maintained for over 100 cycles.

Figure 3A:
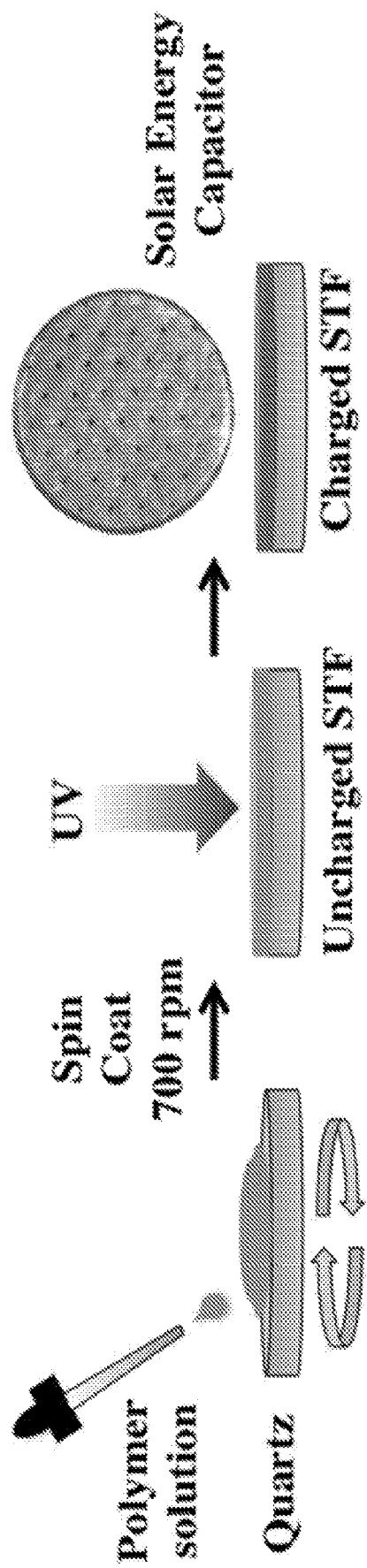
FIGS. 3A-3G show solid-state polymer solar thermal fuel films.
Figures 3B, 3C:
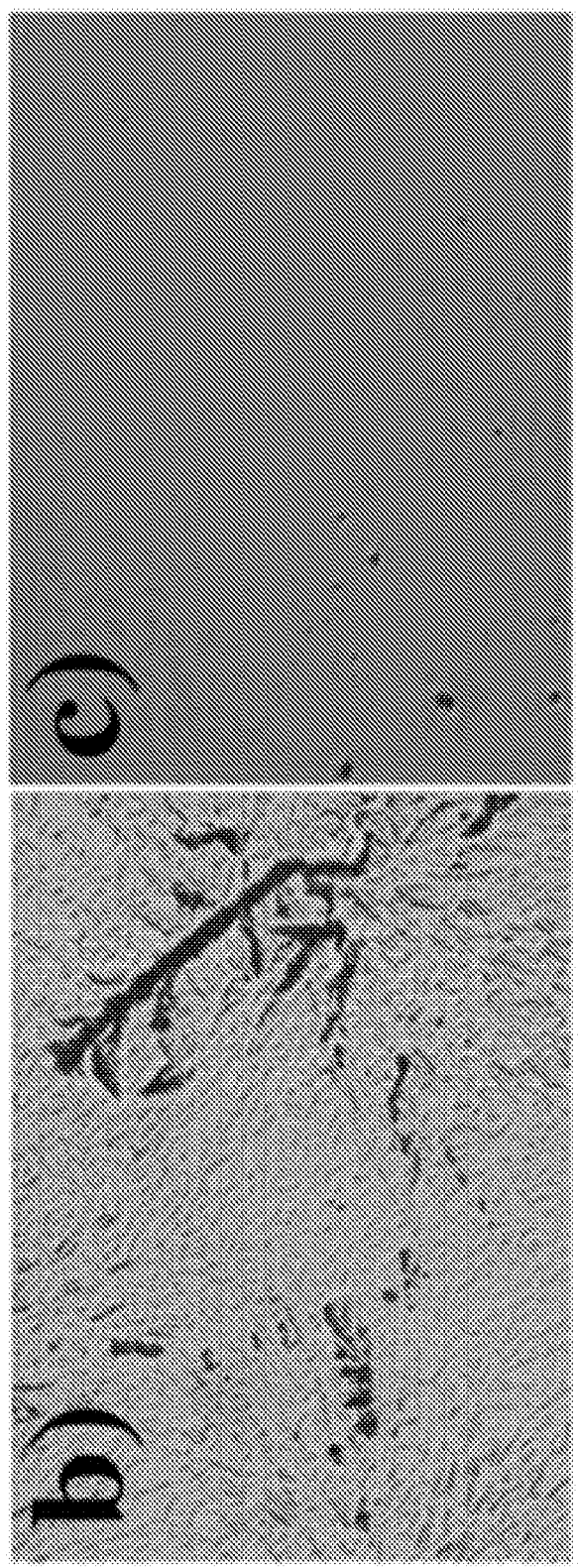
Figure 3D:
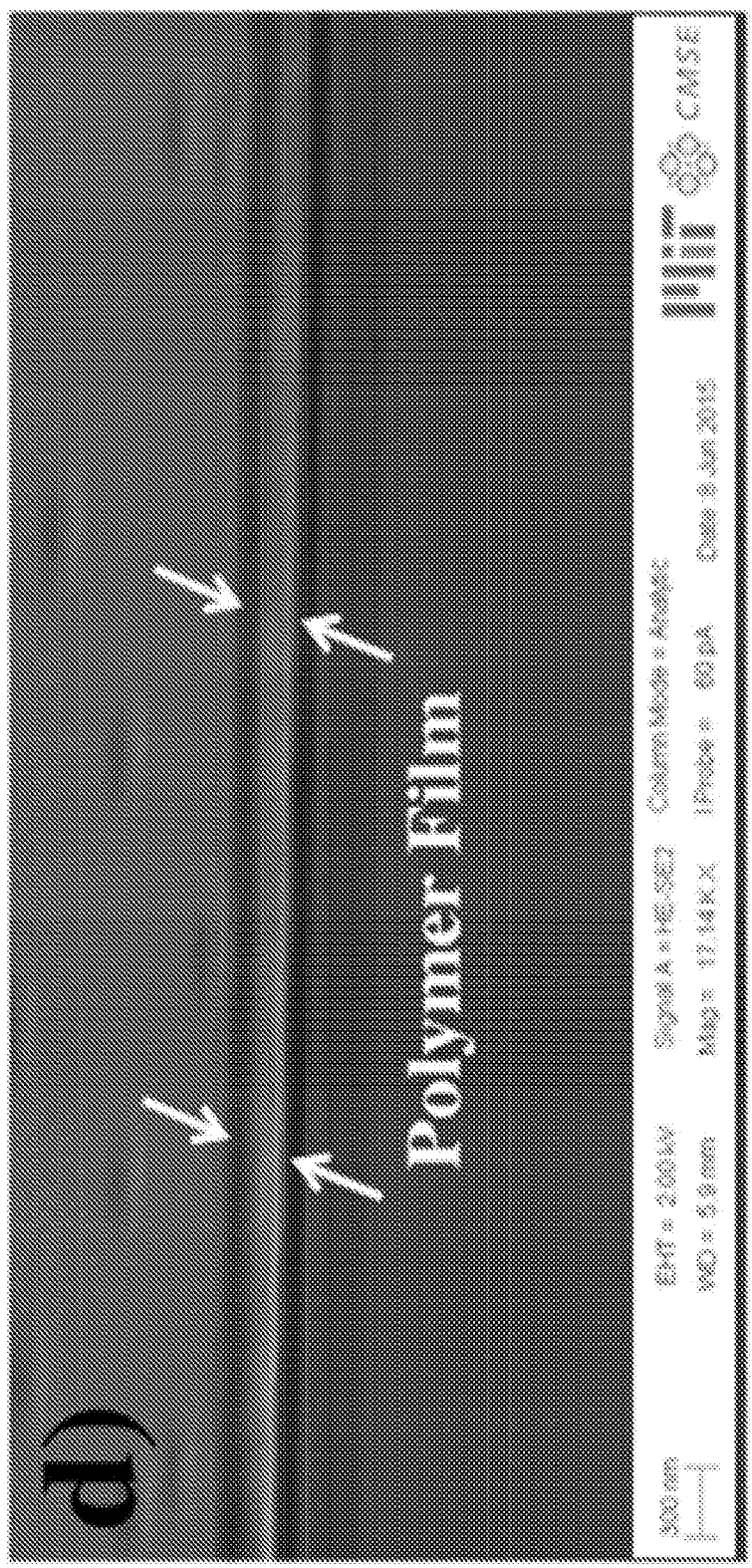

In order to transition the materials to the solid-state, several facile strategies are available, such as tape-casting, drop-casting, and spin-coating. The former two techniques generally result in morphologically poor films, however enable high thicknesses, while the latter results in good morphology but at the cost of low thickness or incomplete coverage at low spin speeds. FIG. 3A depicts the development of the solid state STF platform by constructing a simple Solar Thermal Energy Capacitor (STEC) using a transparent fixed-size quartz substrate and depositing the STF materials on top using toluene via spin-coating. Charging is accomplished with UV illumination using a lamp centered at 365 nm. Inset shows a 1" diameter semi-transparent Solar Thermal Energy Capacitor atop a cleanroom matt. Such a device ensures that it is possible to monitor the optical properties during charging and discharging cycles, and allows for highly reproducible samples. Upon inspection of optical microscope images comparing the monomer and polymer STECs in FIGS. 3B and 3C, it is immediately evident that the polymer approach is ideal for the development of smooth and crack-free films (2 mm y-axis). The polymer films are smooth compared to the highly rough monomer films. Cross-sectional analysis (FIG. 3D) revealed that the polymer films are highly uniform in thickness.

Figure 3E:
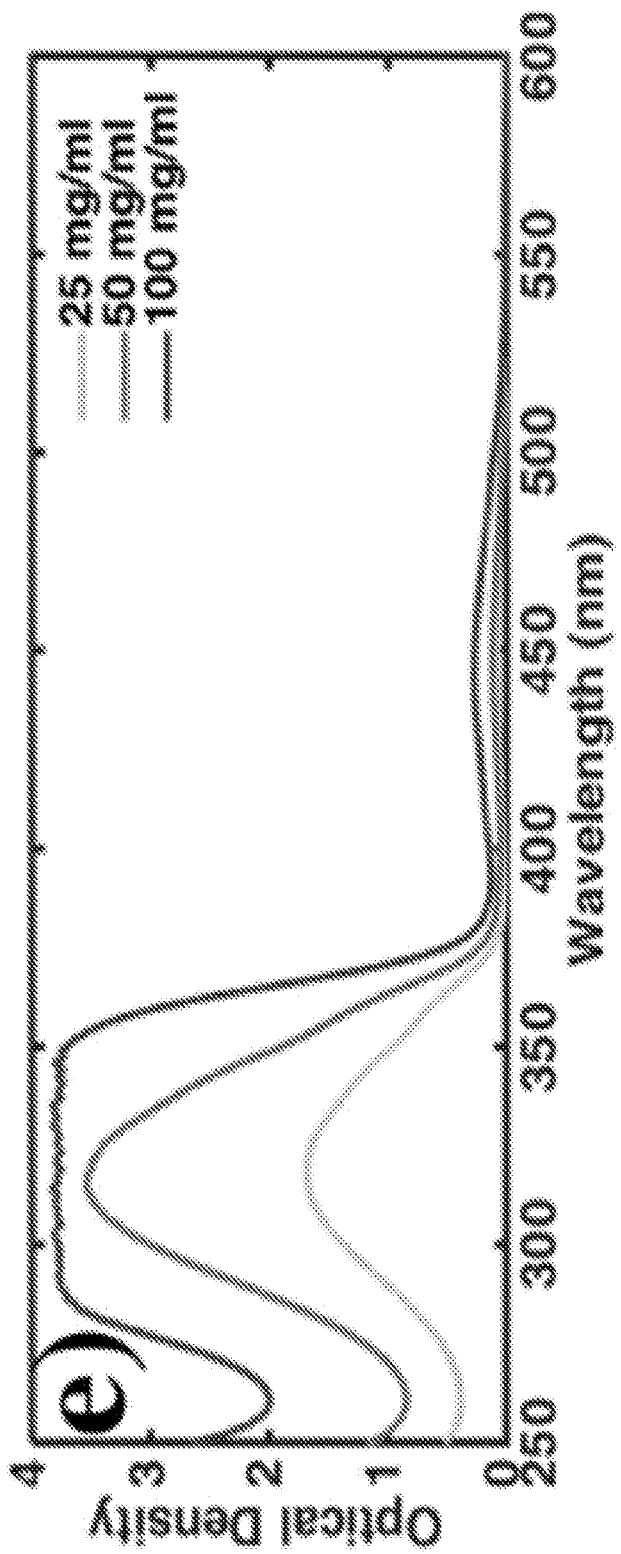
Figure 3G:
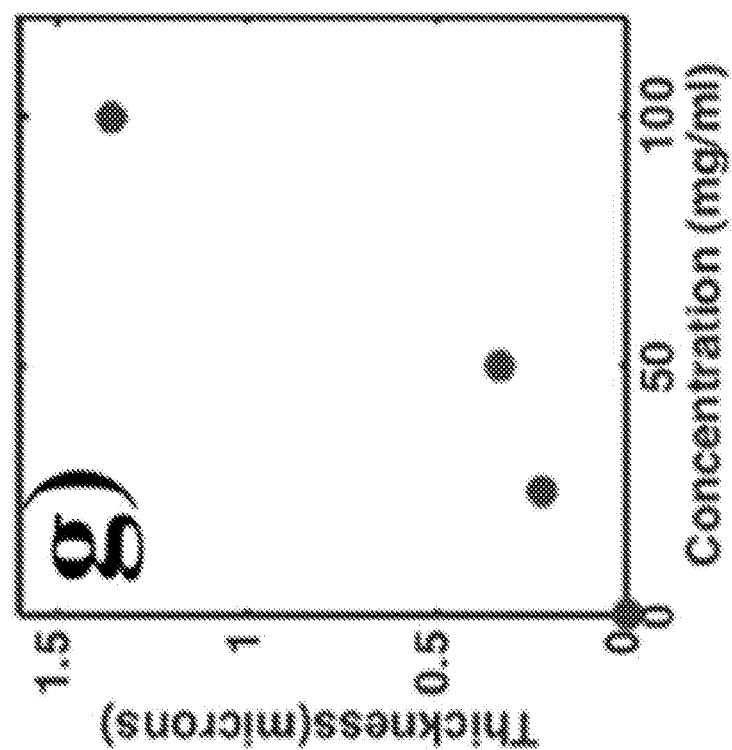
Figure 3F:
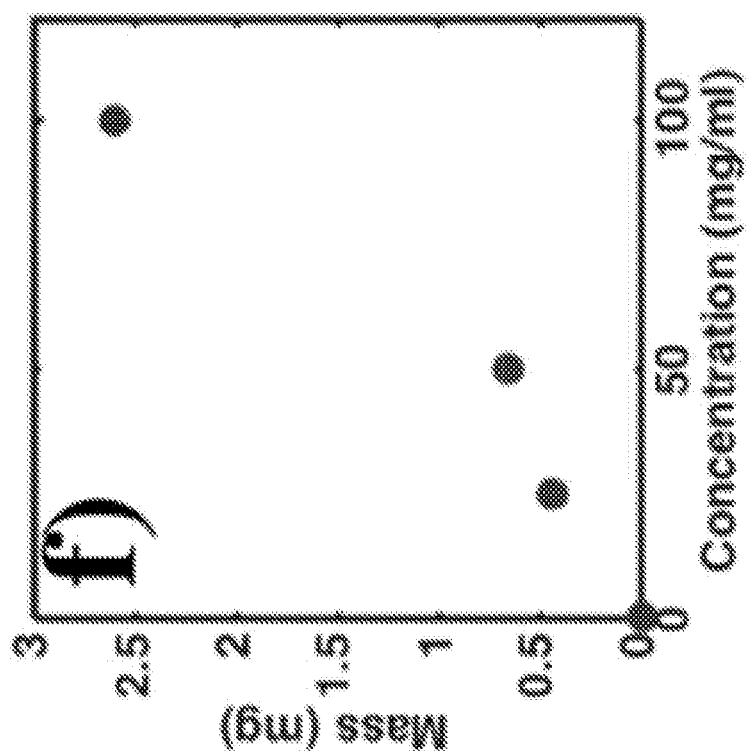

In order to see the scalability of the spin-coating process, solution concentrations spanning 25 to 100 mg/ml was used, where the latter regime approaches the solubility limit of the material in toluene. FIG. 3E shows that using the 50 mg/ml process, more than 99% of the light is absorbed, while the 100 mg/ml process saturates the detector. In FIGS. 3F and 3G, the mass and thickness of the STF film for plotted for each type of STEC process (in this case, concentration variation). Importantly, a film of 1 μm has a mass in the range of several milligrams, and can already absorb all of the light in the UV region. This result, along with the energy density of the material, are crucial in determining the thickness and charging requirements for the material, because while at greater thicknesses and masses the total energy is increased, the photon penetration depth and thus charging is highly stagnated given some non-unity photostationary cis state. See H. M. D. Bandara, S. C. Burdette, *Chem. Soc. Rev.* 2012, 41, 1809, which is incorporated by reference in its entirety.

Figure 4A:
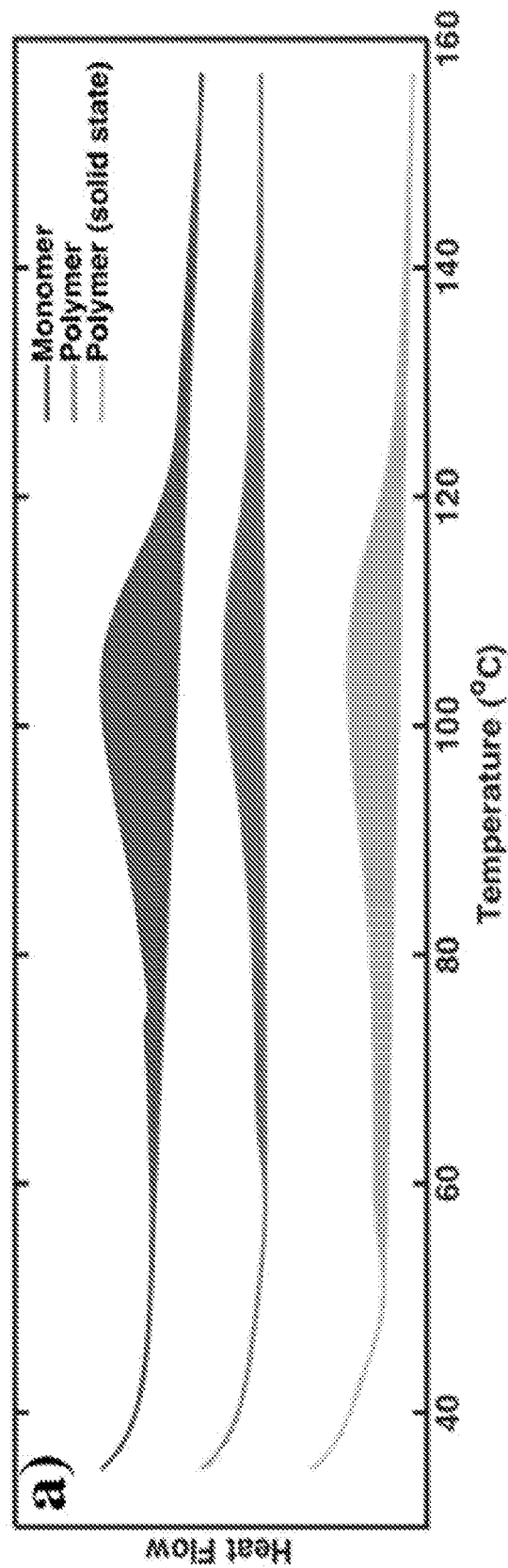
FIGS. 4A-4D show charging, discharging and thermal properties of solid-state polymer solar thermal fuels.
Figure 4B:
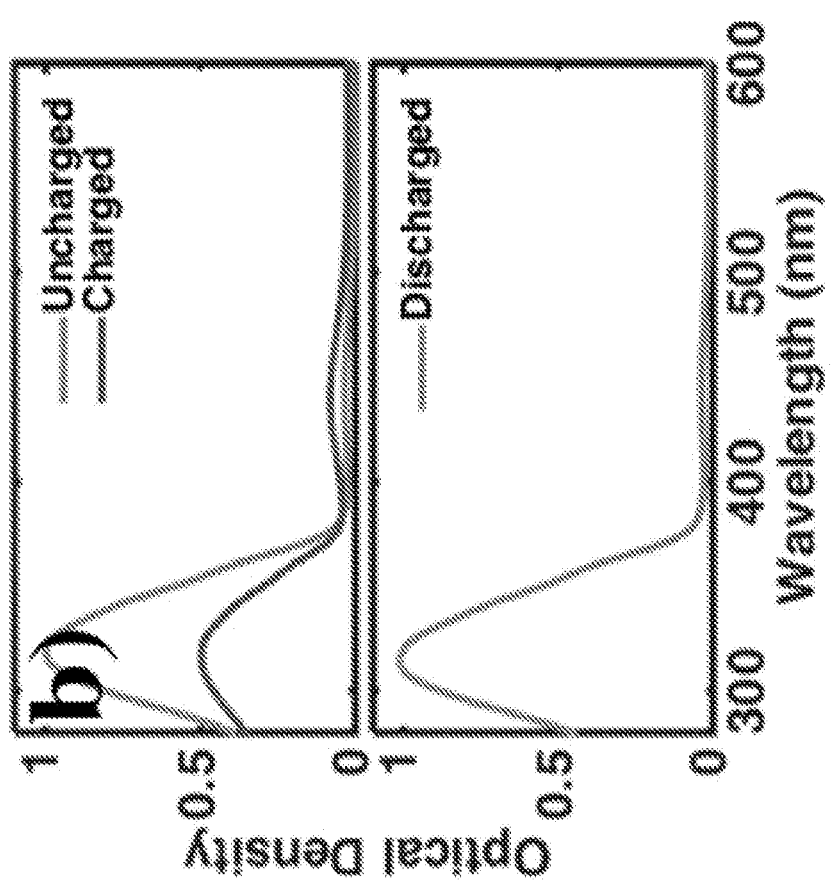
Figure 8:
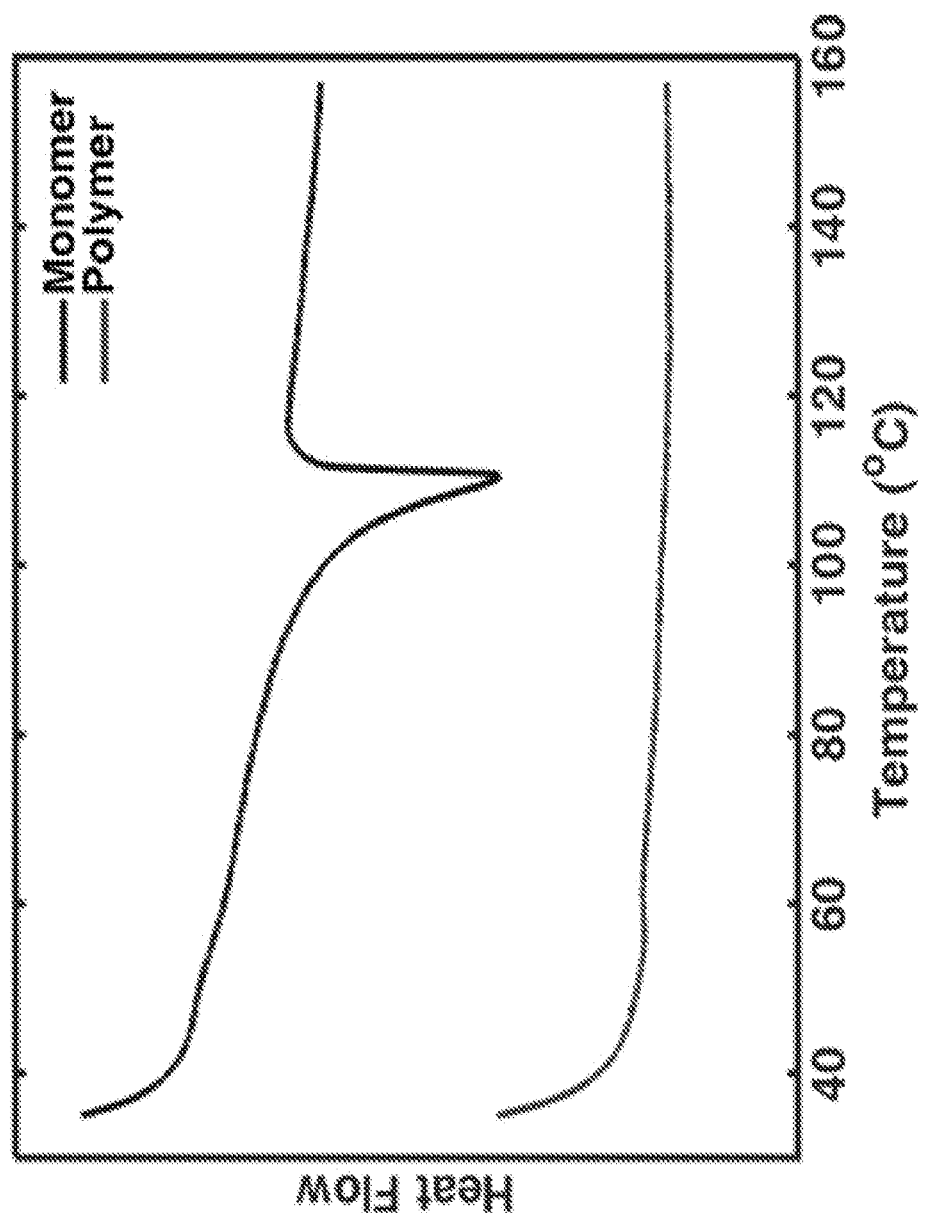
FIG. 8 shows scanning differential calorimetry.
Figure 9:
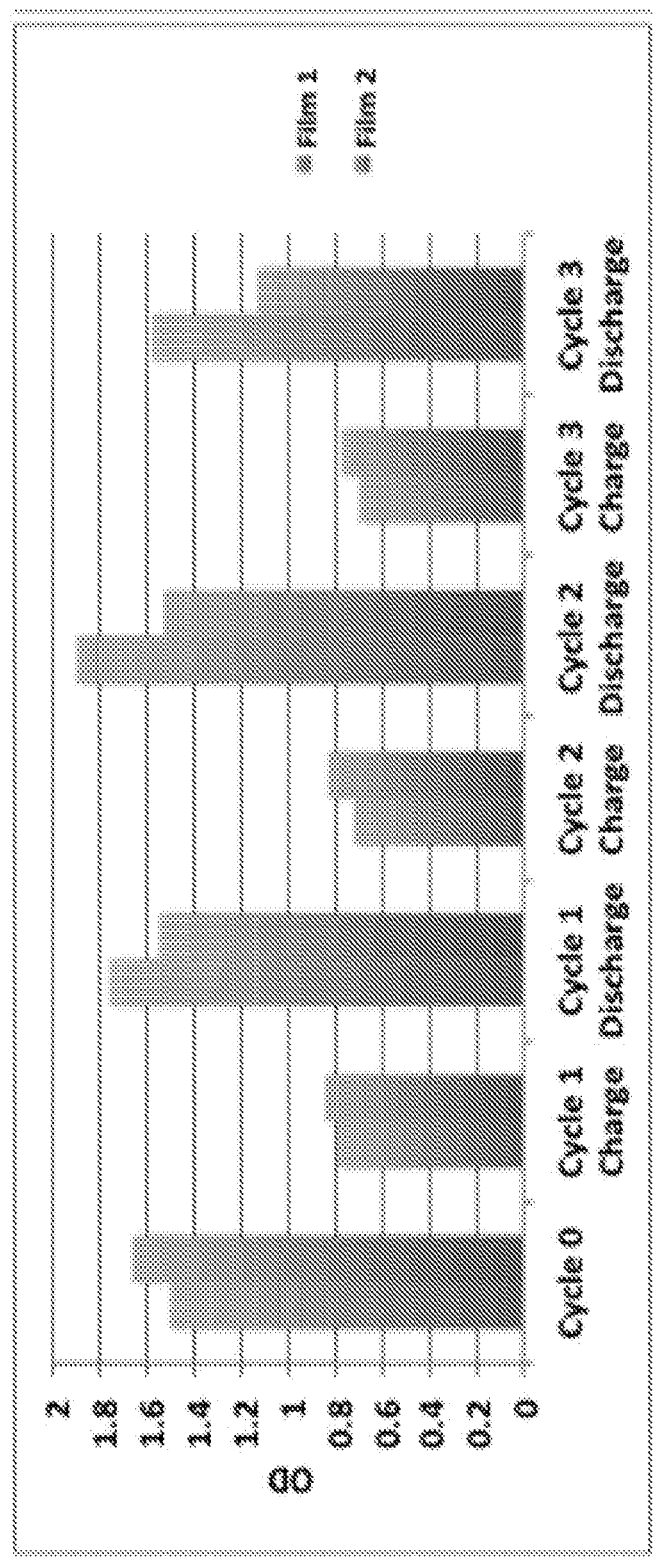
FIG. 9 shows cycling behavior in the solid state.

Differential scanning calorimetry (DSC) measurements were used to accurately determine the energy storage potential of the STF materials. FIG. 4A shows heat release curves for the monomer (42 WhKg$^{-1}$) and polymer (29 WhKg$^{-1}$) moieties charged in solution (toluene). +y direction represents heat release, and the Gaussian regions colored overtop a flat baseline represent the integrated energy release. Importantly, no melting regime was observed for the polymer in this temperature range (FIG. 8). FIG. 8 shows differential calorimetry scan of discharged materials. The monomer shows melting at approximately 110° C. while the polymer exhibits a flat curve without any peaks. In solid state applications, the melting at these temperatures may not be desirable. Such a difference in energy density may arise from variation in photoswitching quantum yield, absorption, and thermal reversion barriers, influencing the photostationary state. See H. M. D. Bandara, S. C. Burdette, *Chem. Soc. Rev.* 2012, 41, 1809, which is incorporated by reference in its entirety. Steric hindrance may prevent photo-switching in the solid-state due to presence of both rotation (sterics-sensitive) and inversion mechanisms for isomerization, thus limiting the performance of the STECs. See Y.-Q. Shen, H. Rau, *Makromol. Chem.* 1991, 192, 945, and M. Schönhoff, M. Mertesdorf, M. Lösche, *J. Phys. Chem.* 1996, 100, 7558, each of which is incorporated by reference in its entirety. In order to test this, the polymer STEC was illuminated with UV (365 nm center mercury lamp), and recorded their absorption spectra. As shown in FIG. 4B, the initial uncharged STEC transitions to a charged state upon irradiation, evident through a reduction in the 325 nm peak corresponding to the $\pi > \pi^*$ transition and emergence of the 450 nm peak (corresponding to the cis $n > \pi^*$ transition). Reduction of the high-energy 325 nm peak and increase in the 450 nm peak is indicative of the trans to cis transition. A single film is first charged (top), and then discharged (bottom) returning to its original state. Upon mild heating (80° C.), the initial spectrum is fully recovered, with more rigorous heat resilience tested at temperatures approaching 180° C. (FIG. 9). Cycling of solid-state films prepared with the 25 mg/ml process, tracking the 325 nm peak on two films. Discharging was done using a hotplate at a temperature of 150° C. Variation arises due to having to repeated re-alignment for absorption measurements and slightly different spots on the film being measured after each discharge cycle. Stress testing the film showed a degradation onset at approximately 180° C. observable by eye and from UV-vis spectra. Despite optical evidence of photo-switching, the exact energy density of the STEC must be measured once it is charged in solid state. In order to achieve this, a STEC (25 mg/ml process) was charged and re-dissolved and dried within a DSC pan. As shown in FIG. 4A, a similar energy density was measured as in the solution-state, with an average energy density of 26±1 WhKg$^{-1}$ based on 5 identical trials.

Figures 4C, 4D:
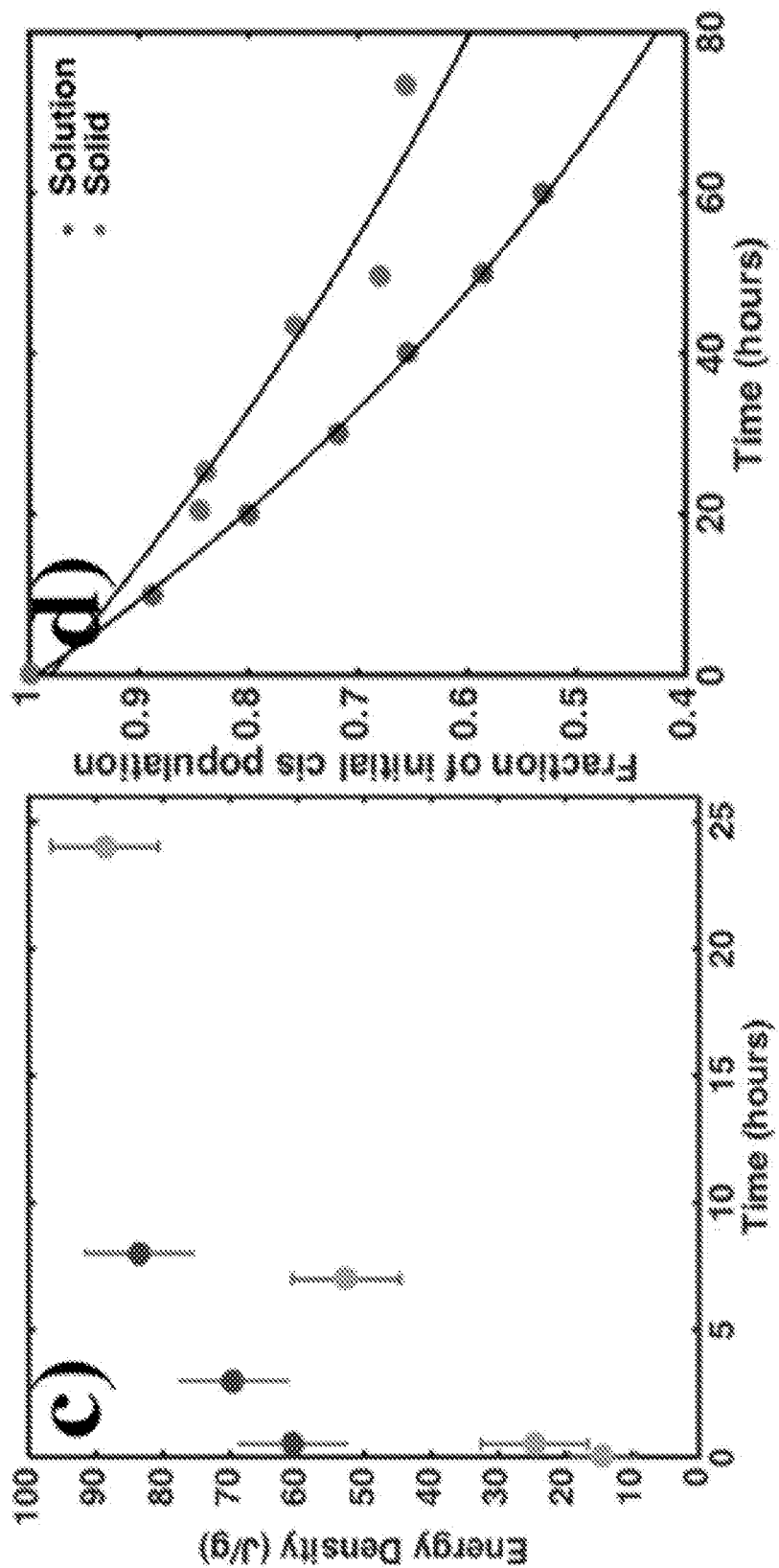

To achieve a large heat release per unit area, the total energy stored within the material is most easily increased with thickness, but at the cost of light penetration. As the material is charged, it consists of an advancing front of newly converted cis isomer (weakly absorbing UV) followed by the uncharged trans portion; however, due to a non-unity photostationary state in these systems, and non-zero absorption by the cis isomer in the spectral region of the UV lamp, the UV penetration will be stagnated thus greatly increasing the charging time. FIG. 4C shows STECs that have been charged and measured to within 90% of their fully charged state for 2 different processing conditions. With greater thickness the charging time is dramatically increased. The rise of the energy density as a function of time is very rapid at first but then stagnates. For the 100 mg/ml process (~1-2 micron, 2-3 mg), the charging time is more than a day; however, charging still takes place despite over 99.9% of the light being absorbed within the first 400-500 nm in the uncharged film (FIGS. 3E and 3G). Similar to charging properties of the STEC, it is important to verify the discharging expectation when transitioning between solution and film. FIG. 4D plots the relative fraction of remaining cis isomer after charging in both solution and solid state. Fitting with an exponential decay, the solid-state material can achieve 20% to 40% (best, plotted) improvement in the decay constant, extending the lifetime of the charged stage. This is consistent with crystalline-phase azobenzene small molecules having greatly increased thermal activation barriers for the cis isomer in the solid state. See M. Tsuda, K. Kuratani, *Bull. Chem. Soc. Jpn.* 1964, 37, 1284, which is incorporated by reference in its entirety. Importantly, such length-scales are sufficiently adequate for daily solid-state applications where energy may be stored effectively for later use.

In order to meet the requirements of a tunable solid-state STF platform, the STEC must have thickness (and thus mass) control well into the micron and millimeter scales. Ideally, the spin-coating process can be extended to make multiple layers by repeated deposition cycles; however, repeatedly exposure to more STF in a solvent simply re-dissolved the underlying film. To remedy this, a hybrid scheme was developed where a liquid cross-linking polymer (polyglycol diacrylate PGda, n=250) was used to readily dissolve the STF polymer. The resultant solution is then spincoated and UV-cured (FIG. 5A) thereby generating an insoluble layer. UV curing results in an insoluble layer allowing new layers to be deposited on top. The film thickness may be controllably increased in such a way; however, with the drawback of a reduction in the gravimetric energy density.

Figure 5A:
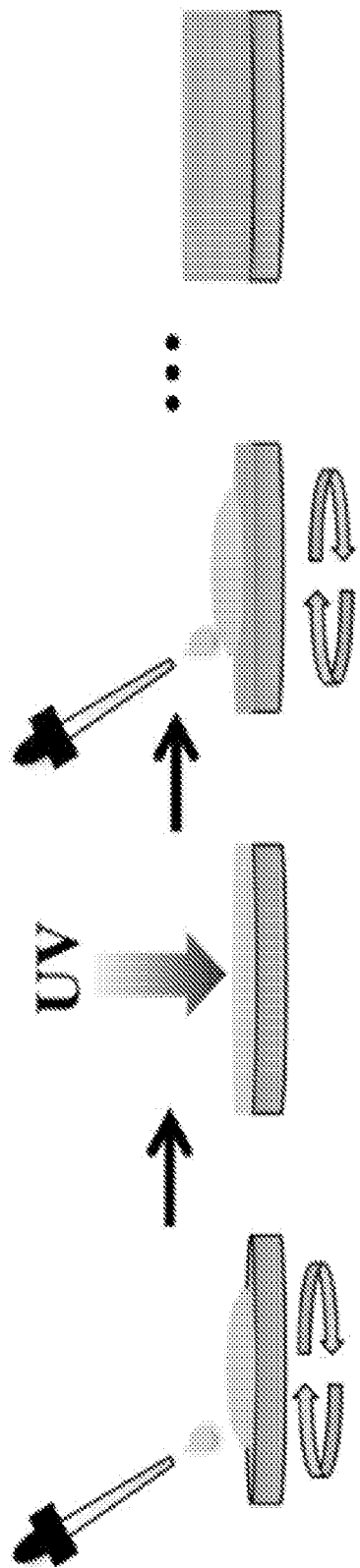
FIGS. 5A-5F show cross-linking approach for layer-by-layer solid-state STFs.
Figure 5B:
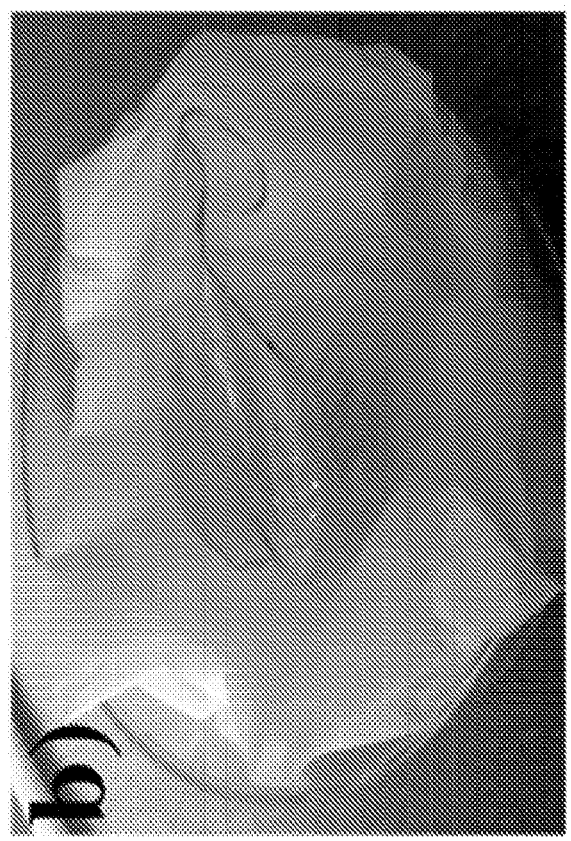
Figure 5C:
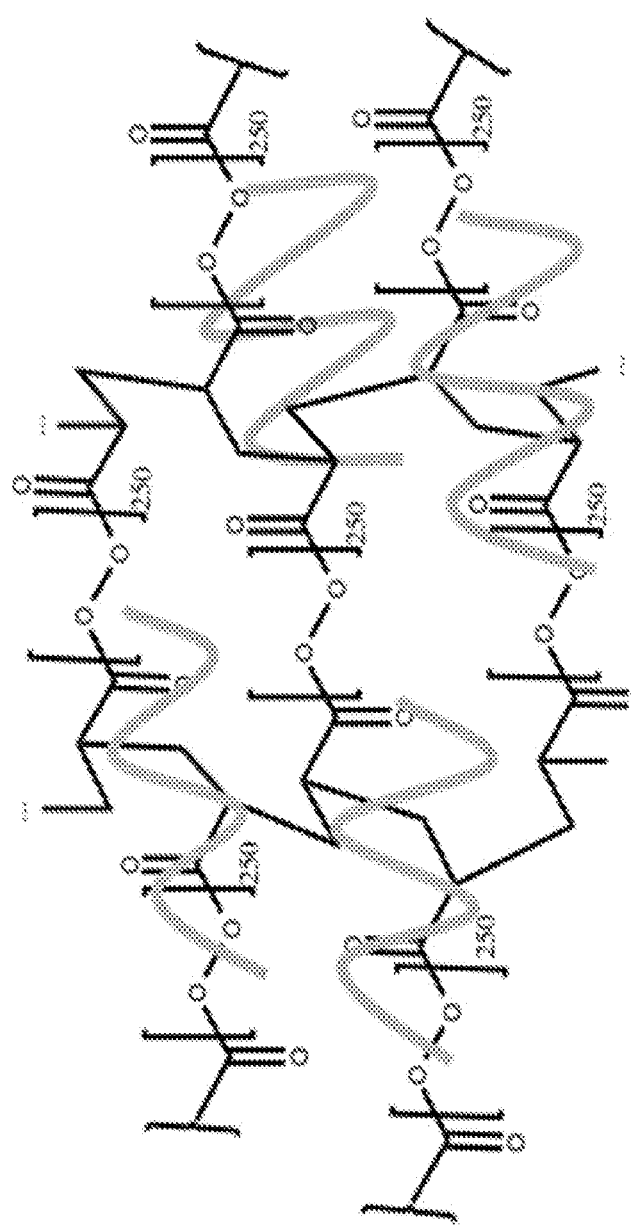
Figure 5D:
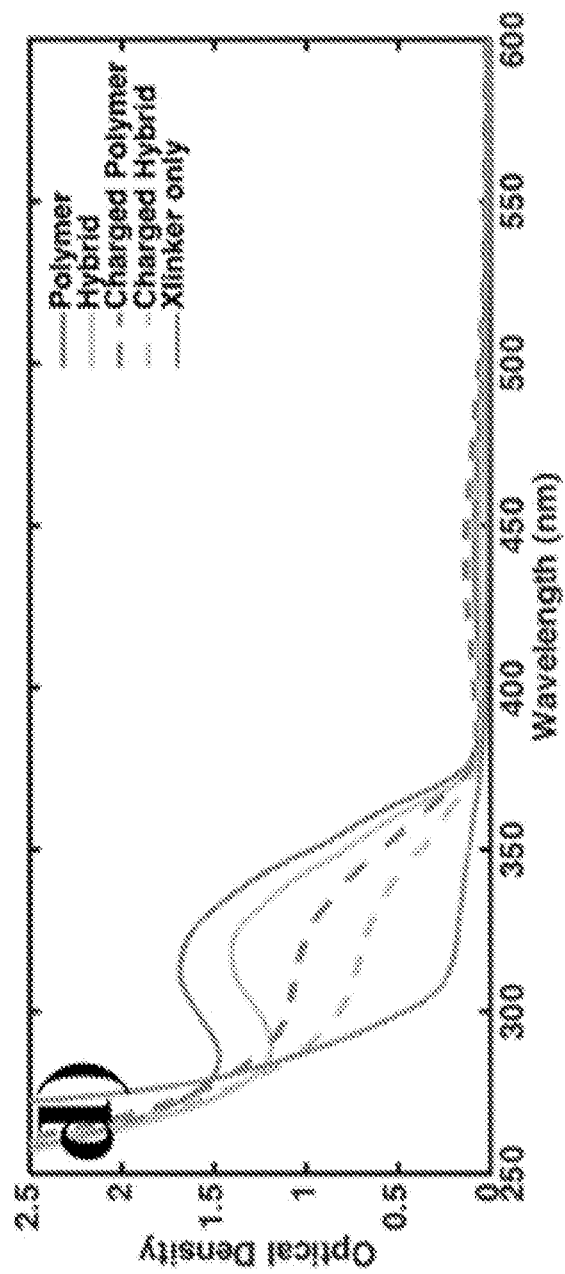

As an initial test of this approach, a thick (>1 mm), flexible, and freestanding polymer STF film (FIG. 5B) was generated by UV-crosslinking the liquid STF hybrid. This large-scale film was insoluble and showed incorporation of the STF given its orange color. Upon cross-linking, the PGda forms a rigid network that traps the STF polymer inside (FIG. 5C). Given that the number of PGda units is tunable, such an approach can generate films with different steric properties that can in principle be designed to increase the energy density of the STF themselves. See A. M. Kolpak, J. C. Grossman, *J. Chem. Phys.* 2013, 138, which is incorporated by reference in its entirety. Additionally, the cross-linker may be tailored to have absorption that overlaps strongly with the cis isomer, thus limiting the rate of back-reaction and leading to a higher photostationary state. Absorption spectra on single layer films with and without cross-linker (FIG. 5D) revealed that the cross-linking does not interfere with charging of the STF films, as evident by the reduction of the 325 nm peak after charging. Furthermore, the cross-linker does not limit absorption, given minimal absorption for a comparable thickness film in the spectral region required for the $\pi > \pi^*$ STF transition. However, the STF polymer may prevent cross-linking of PGda itself due to its strong absorption, hence UV crosslinking requires careful balancing of both species.

Figure 5E:
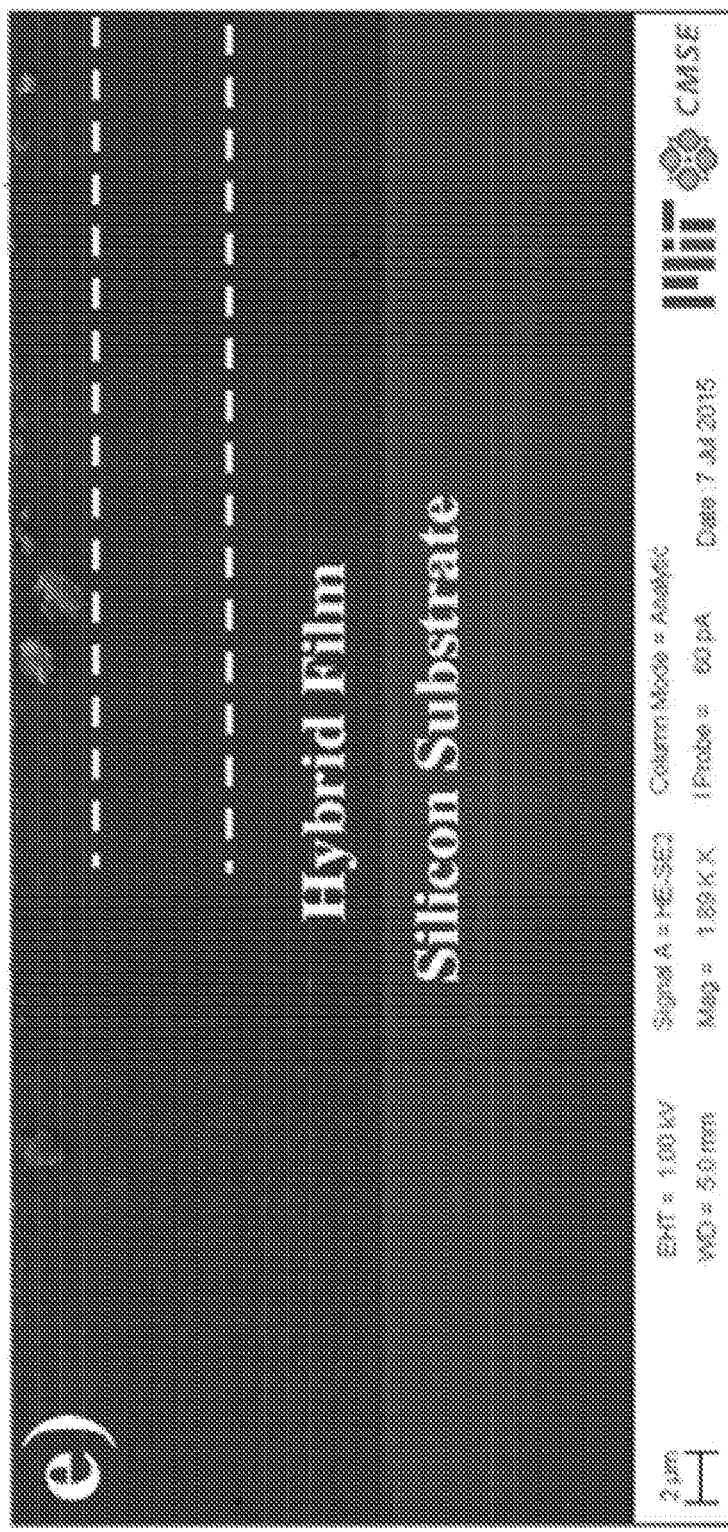
Figure 5F:
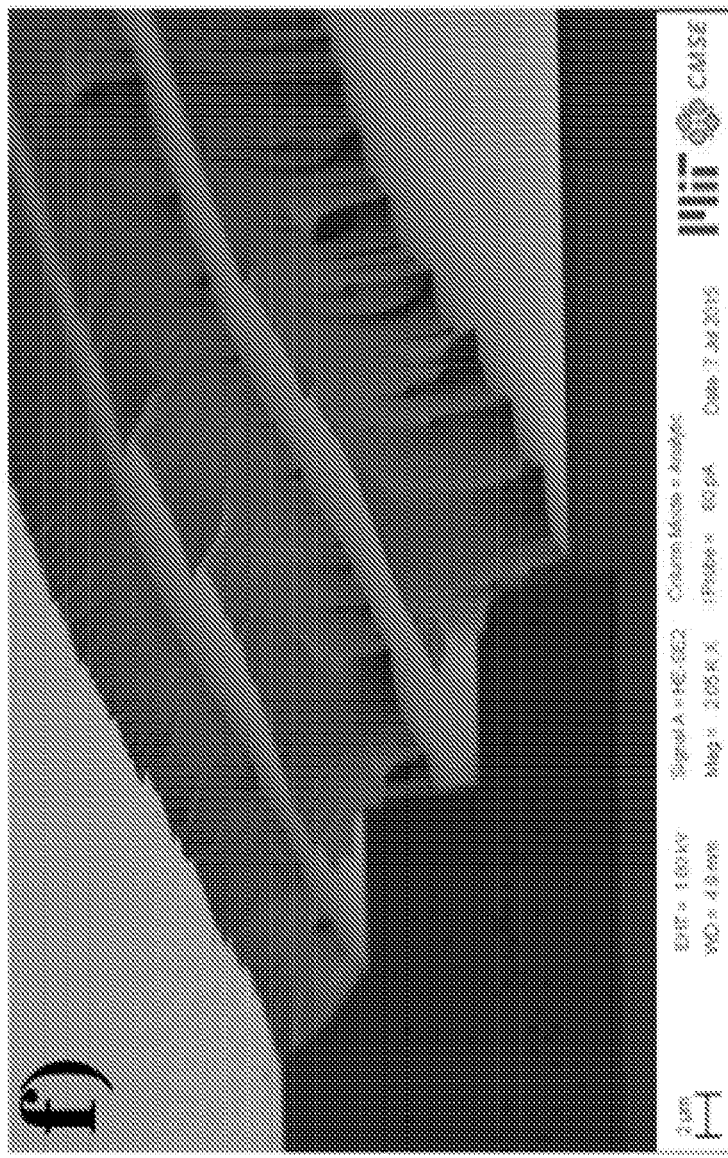

In order to demonstrate the formation of a layer-by-layer film, the polymer STF was mixed into the UV-crosslinker at a 1:10 STF to cross-linker unit ratio. Tailoring the spin speed enabled to form thin viscous layers atop a silicon substrate, that were then readily cross-linked into insoluble solid-state films by UV irradiation. As a proof of concept, 3 such layers were constructed atop one another and imaged with scanning electron microscopy (SEM). The cross section in FIG. 5E depicts a thick hybrid film where individual layers may be resolved. To better resolve the three layers, the film was intentionally sheared to reveal the profile shown in FIG. 5F. Importantly, these films are very uniform, adherent to one another, and present a scalable way to make variable thickness STECs not limited by the spin-coating approach. This engineering concept presents further opportunities to incorporate cross-linking units onto the azobenzenes themselves in order to increase STF loading or to construct co-polymers with cross-linkable moieties, where the ratio of STF to cross-links may be precisely controlled. See, G. Han, H. Zhang, J. Chen, Q. Sun, Y. Zhang, H. Zhang, *New J. Chem.* 2015, 39, 1410, and C. Qin, Y. Feng, W. Luo, C. Cao, W. Hu, W. Feng, *J. Mater. Chem. A* 2015, 3, 16453, each of which is incorporated by reference in its entirety.

Figure 6A:
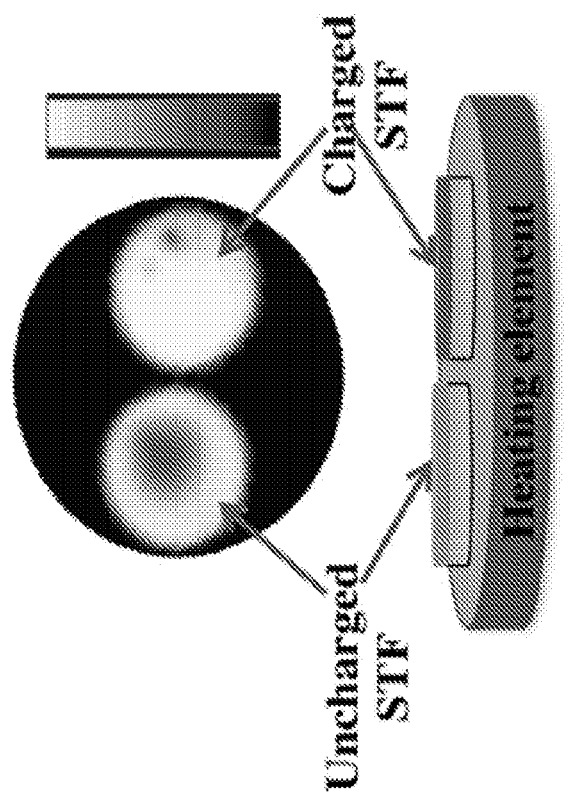
FIGS. 6A-6C show macroscopic STF polymer heat release.
Figures 6B, 6C:
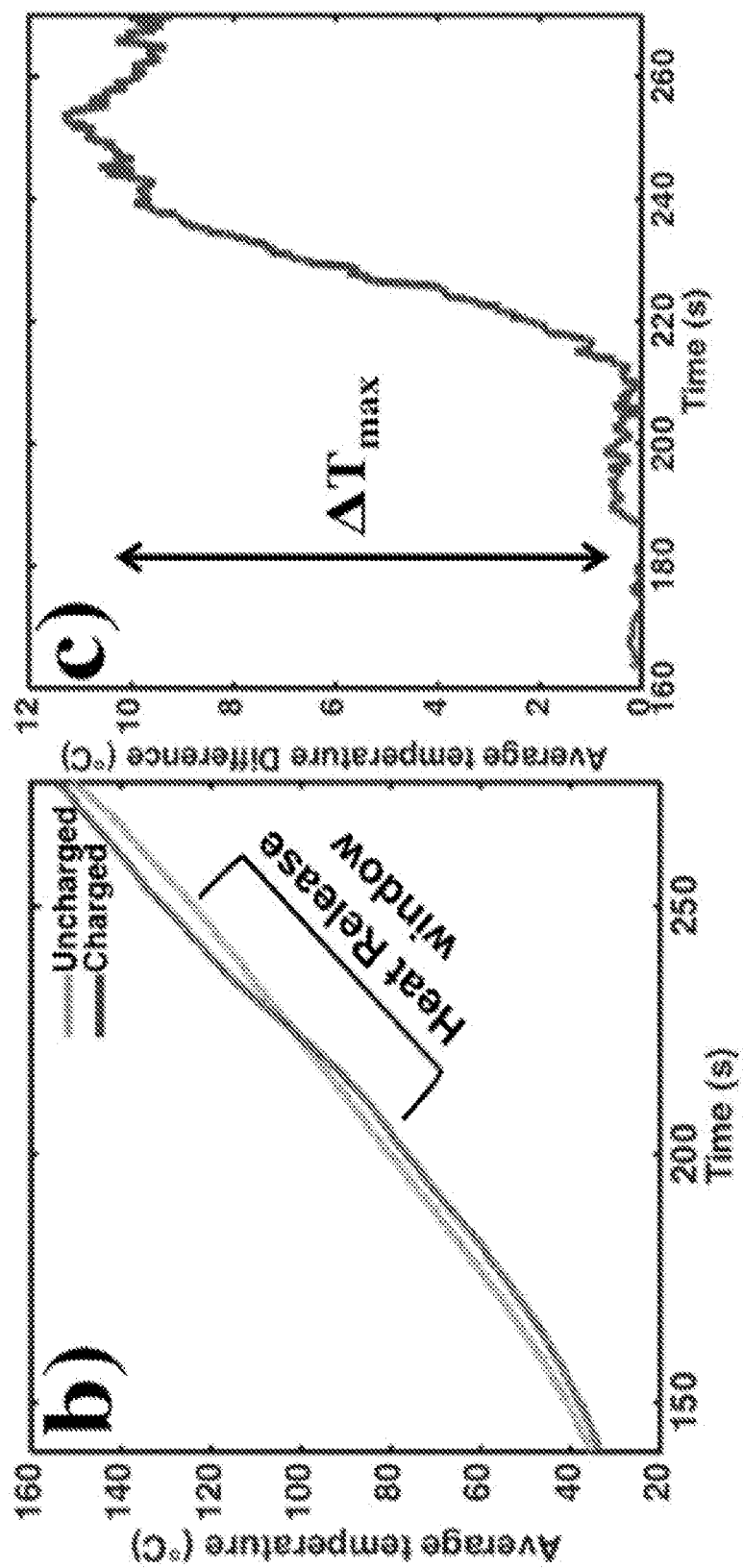
Figure 10:
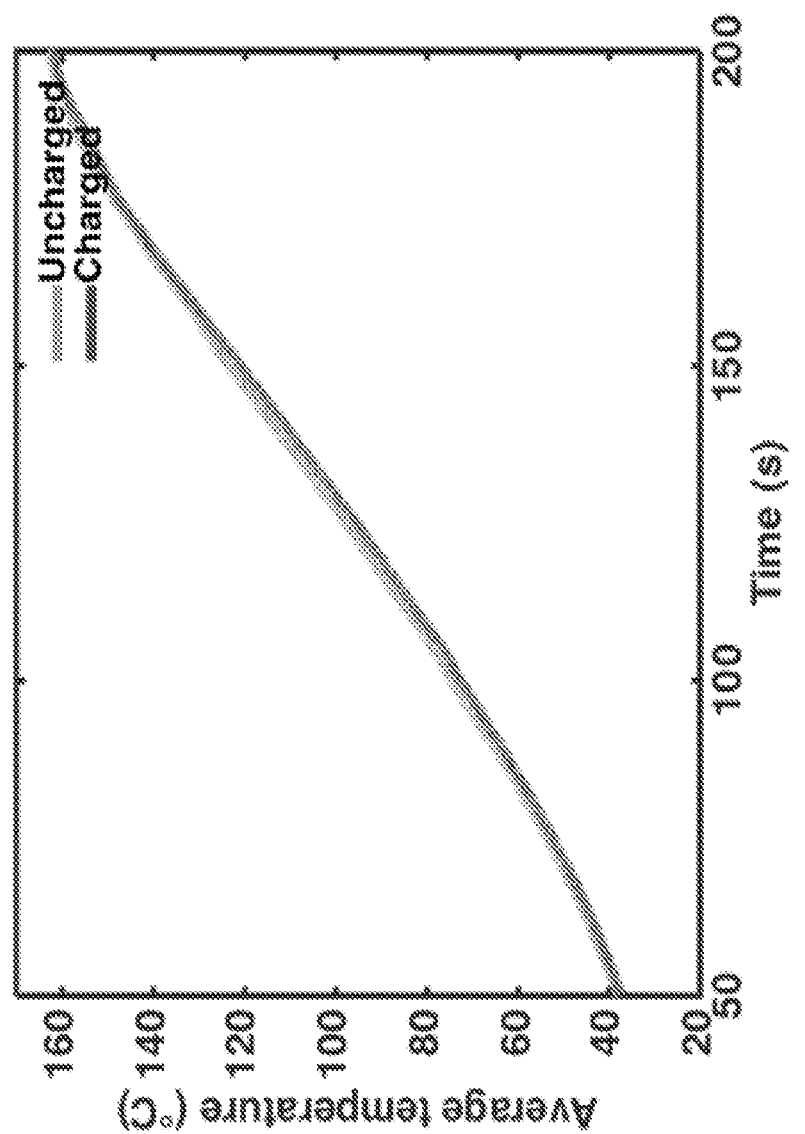
FIG. 10 shows macroscopic heat release control run.

Though the charging, discharging, and appreciable energy release have been demonstrated for the STF polymer materials, it still remains to determine their efficacy as macroscale heat-release STECs for realistic solid-state applications. Within the STEC platform, the substrate mass is approximately 1.8 g, with a heat capacity of 0.8 J/g, effectively requiring around 100 mg of polymer STF to show any appreciable temperature change upon heat release (5-10° C.). However, given the mass required and thickness scaling from FIGS. 3F and 3G (approximately linear with mass), a thickness on the order of 50-100 µm is desirable. Given the considerations in FIG. 4C, such a film would require increased charging requirements. Hence, in order to ensure complete charging and demonstrate macroscopic heat release, the materials were rapidly charged at a low concentration (~1 mg/ml) in the solution state, where charging and deposition solvents need to be chosen judiciously to maximize the energy density. Then, a multi-stage drop casting method was developed in order to build up a thick film, though with greater morphological variation than the spin-coated STECs. In order to measure the heat release, an experimental set-up that triggers the reverse thermal isomerization was designed using a heating stage (FIG. 6A), while simultaneously measuring the spatial temperature profile with an infrared camera (SV.1). Heat map depicted for maximal temperature difference between samples with color bar indicating relative heat magnitude. The response shown in FIG. 6B from the uncharged and charged films is vastly different, where after initial stabilization such that the temperature difference between the two films is constant, the charged film temperature sharply overtake the control film at approximately 100-110° C., consistent with independent DSC measurements. Given the scale of the experiment, thermal coupling within the system, and some inhomogeneity between the STECs, the temperature variation was as high as 2-3° C. for control trials on several uncharged films (FIG. 10), indicating that the measured result was well above this temperature variation. Control runs do not show any appreciable temperature difference between two identical uncharged drop cast films. To gain a better appreciation for the temperature release, in FIG. 6C the curve was normalized at the point where they have both reached a constant temperature difference (~160 s, 40° C. in FIG. 6B), and plot the temperature difference. At least a 10° C. total change ($\Delta T_{max}$) in temperature is observed between the samples due to heat release by the charged STF polymer. A dramatic temperature spike at 220 s results in approximately a 10° C. average temperature difference between the charged and uncharged STECs. Importantly, this heat release results in a temperature difference on the order of several 10 s of seconds, which is important for certain rapid heat-release applications, and serves as the first demonstration of macroscopic, solid-solid-state application-oriented heat release from an STF material.

In summary, this approach enables uniform films capable of appreciable heat storage of up to 30 Whkg$^{-1}$ and that can withstand temperature of up to 180° C. A macroscopic energy release using spatial infrared heat maps with up to a 10° C. temperature change demonstrates highly efficient and high energy density STFs for applications in the solid-state. The development of the Solar Thermal Fuel Capacitor platform using polymer films enable the charging, discharging, and heat release using optically chargeable molecules within the solid-state. Polymer STF materials enable uniform morphologies that can span thicknesses of 100 nm to several 10s of microns with added tunability by employing UV activated cross-links. By studying the charging and discharging properties, and the heat energy stored within the STECs, it was possible to construct a macroscopic device resulting in temperature differences as high as 10° C., demonstrating the feasibility of these devices for solid-state applications. Given the rich chemistry available on the monomer and the polymer backbone, these additional degrees of freedom can be leveraged to enhance the energy density, improve the optical chargeability and photostationary state, and collect photons across a greater portion of the solar spectrum. With such unprecedented materials flexibility and demonstrated feasibility for solid-state applications, STF materials employed in the solid-state present a tremendously attractive avenue for both fundamental light-matter interaction science and solid-state applications for renewable energy storage and heat release.

Conformal Electroplating of Azobenzene-Based Solar Thermal Fuels onto Large Area and Fiber Geometries Solar energy is one of the most energetic and abundant renewable resources available on Earth. Collecting this energy typically involves an active material that can transduce photons into other useful types of energy, where a specific form factor is required to maximize the efficiency of energy harvesting and utilization. For example, colloidal quantum dots are synthesized in solution and are excellent solar absorbers, but require to be deposited into solid-state arrays to transport the resultant charges. See Choi, J.-H.; Wang, H.; Oh, S. J.; Paik, T.; Sung, P.; Sung, J.; Ye, X.; Zhao, T.; Diroll, B. T.; Murray, C. B.; Kagan, C. R. Exploiting the Colloidal Nanocrystal Library to Construct Electronic Devices. *Science* 2016, 352 (6282), 205-208, and Kim, J. Y.; Voznyy, O.; Zhitomirsky, D.; Sargent, E. H. 25th Anniversary Article: Colloidal Quantum Dot Materials and Devices: A Quarter-Century of Advances. *Adv. Mater.* 2013, 25 (36), 4986-5010, each of which is incorporated by reference in its entirety. Alternatively, organic dyes can simply be deposited as a monolayer on a semiconducting metal oxide while also being immersed in an electrolyte to facilitate for charge collection, as is done in dye-sensitized solar cells. See, Hardin, B. E.; Snaith, H. J.; McGehee, M. D. The Renaissance of Dye-Sensitized Solar Cells. *Nat. Photonics* 2012, 6 (3), 162-169, and Docampo, P.; Guldin, S.; Leijtens, T.; Noel, N. K.; Steiner, U.; Snaith, H. J. Lessons Learned: From Dye-Sensitized Solar Cells to All-Solid-State Hybrid Devices. *Adv. Mater.* 2014, 26 (24), 4013-4030, each of which is incorporated by reference in its entirety. Molten salts must undergo a phase transition in order to store solar heat energy efficiently, and recently reported solar thermal fuel (STF) materials may be employed in both solution and solid-state to accomplish simultaneous energy conversion and storage. See, Bauer, T.; Pfleger, N.; Breidenbach, N.; Eck, M.; Laing, D.; Kaesche, S. Material Aspects of Solar Salt for Sensible Heat Storage. *Appl. Energy* 2013, 111, 1114-1119, Zhitomirsky, D.; Cho, E.; Grossman, J. C. Solid-State Solar Thermal Fuels for Heat Release Applications. *Adv. Energy Mater.* 2016, 6 (6), Kucharski, T. J.; Ferralis, N.; Kolpak, A. M.; Zheng, J. O.; Nocera, D. G.; Grossman, J. C. Templated Assembly of Photoswitches Significantly Increases the Energy-Storage Capacity of Solar Thermal Fuels. *Nat Chem* 2014, 6 (5), 441-447, and Borjesson, K.; Ćoso, D.; Gray, V.; Grossmann, J. C.; Guan, J.; Harris, C. B.; Hertkorn, N.; Hou, Z.; Kanai, Y.; Lee, D.; Lomont, J. P.; Majumdar, A.; Meier, S. K.; Moth-Poulsen, K.; Myrabo, R. L.; Nguyen, S. C.; Segalman, R. A.; Srinivasan, V.; Tolman, W. B.; Vinokurov, N.; Vollhardt, K. P. C.; Weidman, T. W. Exploring the Potential of Fulvalene Dimetals as Platforms for Molecular Solar Thermal Energy Storage: Computations, Syntheses, Structures, Kinetics, and Catalysis. *Chem. Eur. 1* 2014, 20 (47), 15587-15604, each of which is incorporated by reference in its entirety.

Small functional molecules and colloidal nanomaterials can be integrated into thin-films for solid-state device applications. Many of these materials are synthesized in solution and there often exists a significant barrier to transition them into the solid-state in an efficient manner. An STF molecule such as azobenzene can undergo trans to cis isomerization upon absorption of an appropriate UV energy photon, whereby energy is stored within the conformation of the molecule, and can later be retrieved as heat. Integrating STFs within the solid-state form-factor opens an avenue towards implementation in solid-state energy devices for heat release applications. See Zhitomirsky, D.; Cho, E.; Grossman, J. C. Solid-State Solar Thermal Fuels for Heat Release Applications. *Adv. Energy Mater.* 2016, 6 (6), which is incorporated by reference in its entirety. This was accomplished through a facile solution spin-coating deposition process of polymer materials that resulted in uniform thin-films. However this deposition method results in geometry constraints that limit chargeability, thickness, heat release, and heat propagation within the resultant solid-state devices. Furthermore, spin-coating requires a high solubility of the material in the chosen solvent and is prone to result in a large fraction (>90%) of the active material being wasted. Increasing the versatility of these materials will require flexibility of their deposition on arbitrary form factors with controllable thickness and high materials utilization.

Electrodeposition (EPD) onto conducting materials enables utilization of a variety of form factors, is conformal, can employ solutions at low concentrations, and maximizes utilization yield. This facile process requires the material of interest to be dissolved in an electrolyte and bias to be applied between working and counter electrodes to force the dissolved species to migrate and deposit on oppositely charged electrodes. By controlling the deposition conditions (applied voltage or current), it is possible to tune thickness and film morphology. Furthermore, the method is highly scalable, relatively inexpensive, and does not require a complex infrastructure. EPD has recently been used in a variety of energy related applications spanning electrodes for batteries and supercapacitors, and active layer deposition in solar cells. See Ortiz, G. F.; López, M. C.; Alcántara, R.; Tirado, J. L. Electrodeposition of Copper-tin Nanowires on Ti Foils for Rechargeable Lithium Micro-Batteries with High Energy Density. *J. Alloys Compd.* 2014, 585, 331-336, Ponrouch, A.; Frontera, C.; Barde, F.; Palacin, M. R. Towards a Calcium-Based Rechargeable Battery. *Nat Mater* 2016, 15 (2), 169-172, Zhao, Q.; Hu, X.; Zhang, K.; Zhang, N.; Hu, Y.; Chen, J. Sulfur Nanodots Electrodeposited on Ni Foam as High-Performance Cathode for Li—S Batteries. *Nano Lett.* 2015, 15 (1), 721-726, Li, X.; Zhitomirsky, I. Electrodeposition of Polypyrrole-carbon Nanotube Composites for Electrochemical Supercapacitors. *J. Power Sources* 2013, 221, 49-56, Chen, W.; Xia, C.; Alshareef, H. N. One-Step Electrodeposited Nickel Cobalt Sulfide Nanosheet Arrays for High-Performance Asymmetric Supercapacitors. *ACS Nano* 2014, 8 (9), 9531-9541, Ahmed, S.; Reuter, K. B.; Gunawan, O.; Guo, L.; Romankiw, L. T.; Deligianni, H. A High Efficiency Electrodeposited Cu2ZnSnS4 Solar Cell. *Adv. Energy Mater.* 2012, 2 (2), 253-259, and Jeon, J.-O.; Lee, K. D.; Seul Oh, L.; Seo, S.-W.; Lee, D.-K.; Kim, H.; Jeong, J.; Ko, M. J.; Kim, B.; Son, H. J.; Kim, J. Y. Highly Efficient Copper-Zinc-Tin-Selenide (CZTSe) Solar Cells by Electrodeposition. *ChemSusChem* 2014, 7 (4), 1073-1077, each of which is incorporated by reference in its entirety.

Disclosed herein is an azobenzene based STF for EPD utilizing its success with respect to its charging, cycling and energy density properties. This STF polymer material can be readily deposited via EPD onto a variety of substrates in a conformal fashion. A device involving fiber geometries can offer the potential to efficiently store solar energy and transport heat within STF fibers.

STF are most commonly deployed as small-molecule photo-switches, sometimes anchored to additional structures for enhanced properties. See, Zhitomirsky, D.; Cho, E.; Grossman, J. C. Solid-State Solar Thermal Fuels for Heat Release Applications. *Adv. Energy Mater.* 2016, 6 (6), Lennartson, A.; Roffey, A.; Moth-Poulsen, K. Designing Photoswitches for Molecular Solar Thermal Energy Storage. *Tetrahedron Lett.* 2015, 56 (12), 1457-1465, Kucharski, T. J.; Tian, Y.; Akbulatov, S.; Boulatov, R. Chemical Solutions for the Closed-Cycle Storage of Solar Energy. *Energy Environ. Sci.* 2011, 4 (11), 4449-4472, and Luo, W.; Feng, Y.; Cao, C.; Li, M.; Liu, E.; Li, S.; Qin, C.; Hu, W.; Feng, W. A High Energy Density Azobenzene/graphene Hybrid: A Nano-Templated Platform for Solar Thermal Storage. *J. Mater. Chem. A* 2015, 3 (22), 11787-11795, each of which is incorporated by reference in its entirety.

Literature reports remain sparse with respect to EPD of small molecules and azobenzene-containing moieties in particular. See Allwright, E.; Berg, D. M.; Djemour, R.; Steichen, M.; Dale, P. J.; Robertson, N. Electrochemical Deposition as a Unique Solution Processing Method for Insoluble Organic Optoelectronic Materials. *J. Mater. Chem. C* 2014, 2 (35), 7232-7238, and Zhao, R.; Zhan, X.; Yao, L.; Chen, Q.; Xie, Z.; Ma, Y. Electrochemical Deposition of Azobenzene-Containing Network Films with High-Contrast and Stable Photoresponse. *Macromol. Rapid Commun.* 2016, 37 (7), 610-615, each of which is incorporated by reference in its entirety. Generally, in order to deposit robust EPD films, a high molecular weight polymer is desirable. In one approach an EPD procedure was developed for commercially available azobenzene-containing Poly[1-[4-(3-carboxy-4-hydroxyphenylazo)benzenesulfonamido]-1,2-ethanediyl] by employing the inherent negatively charged ionic group that can respond to applied electric field. See Liu, Y.; Luo, D.; Zhang, T.; Shi, K.; Wojtal, P.; Wallar, C. J.; Ma, Q.; Daigle, E. G.; Kitai, A.; Xu, C.-Q.; Zhitomirsky, I. Film Deposition Mechanisms and Properties of Optically Active Chelating Polymer and Composites. *Colloids Surf, A.* 2015, 487, 17-25, which is incorporated by reference in its entirety. However, this polymer did not exhibit favorable solar thermal fuel properties in terms of energy density or chargeability.

In fact, it was found that the additional functional groups decorating the benzene rings of the azobenzene molecule that impart the favorable EPD properties, simultaneously limit its energy storage by greatly curtailing the storage lifetime. See Dokié, J.; Gothe, M.; Wirth, J.; Peters, M. V.; Schwarz, J.; Hecht, S.; Saalfrank, P. Quantum Chemical Investigation of Thermal Cis-to-Trans Isomerization of Azobenzene Derivatives: Substituent Effects, Solvent Effects, and Comparison to Experimental Data. *J. Phys. Chem. A* 2009, 113 (24), 6763-6773, and Garcia-Amoros, J.; Sanchez-Ferrer, A.; Massad, W. A.; Nonell, S.; Velasco, D. Kinetic Study of the Fast Thermal Cis-to-Trans Isomerisation of Para-, Ortho- and Polyhydroxyazobenzenes. *Phys. Chem. Chem. Phys.* 2010, 12 (40), 13238-13242, each of which is incorporated by reference in its entirety. In effect, any modification of the azobenzene molecule to impart new properties (such as those required for EPD) can often negatively affect its STF characteristics.

Figure 11A:
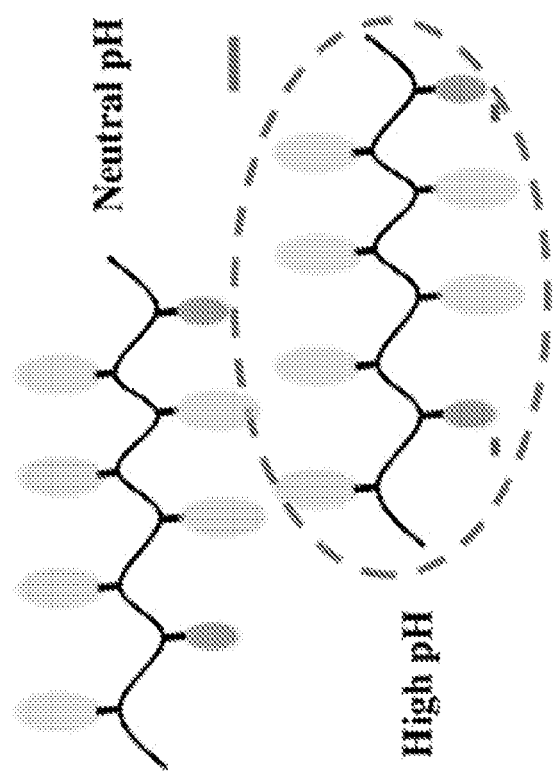
FIGS. 11A-11C show solar thermal fuel co-polymer for electrodeposition.
Figure 11A:
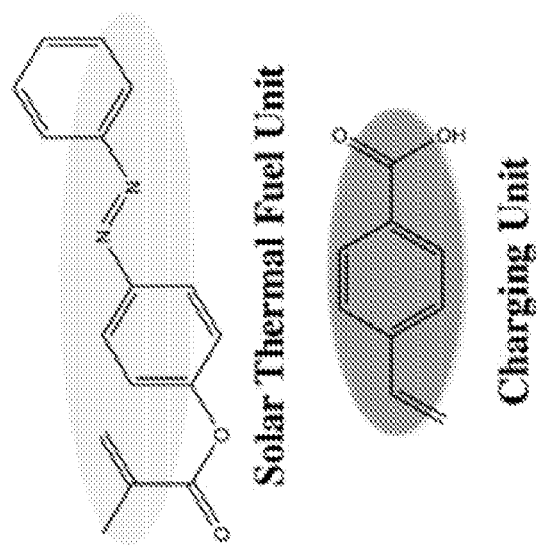
Figure 11C:
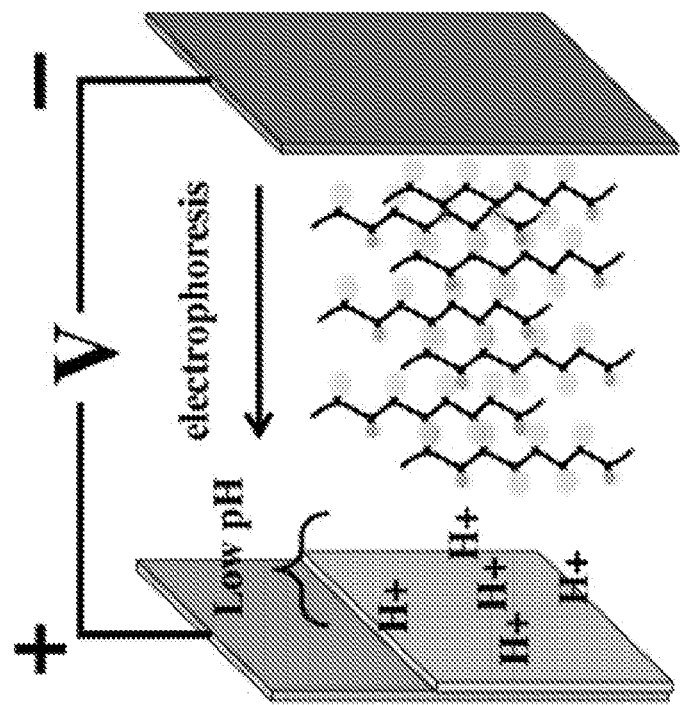
Figure 11B:
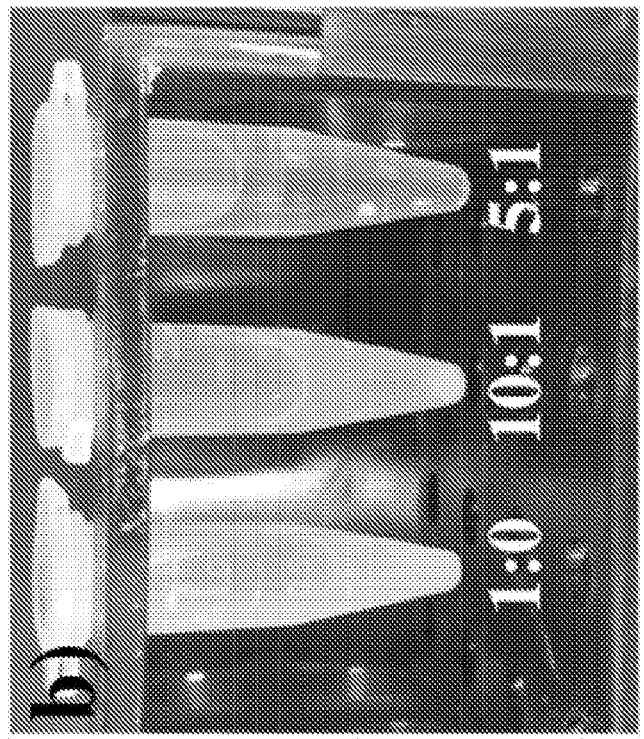

Engineering a polymer material would enable success in the EPD of STF coatings, but would also require a robust strategy of incorporating ionizable moieties without perturbing the azobenzene chemical structure. Engineering such a polymer would ideally preserve all the beneficial energy harvesting and storage properties developed for previously reported solid-state azobenzene films. Additionally, it would be beneficial to retain the facile two-step synthesis process, yield and scalability. To achieve this, a co-polymer consisting predominantly of an azobenzene monomer was developed, a sparsely incorporated 4-vinylbenzoic acid charging unit (FIG. 11A). Incorporation of these units into a co-polymer enables to change the charge and thus solubility based on the pH, thus enabling to generate solid-state coatings under neutral or low pH conditions. Since the charging unit does not contribute to the stored energy density, its content in the polymer should be minimized while still enabling efficient EPD. At neutral pH and acidic pH, such a polymer will ideally be insoluble in the electrolyte, while at a high pH it should readily dissolve and migrate in response to an electric field. See Krylova, I. Painting by Electrodeposition on the Eve of the 21st Century. *Prog. Org. Coat.* 2001, 42 (3-4), 119-131, which is incorporated by reference in its entirety. Several compositions of such a polymer were screended, and FIG. 11B shows the methanol solubility with increasing charging unit percentage. At low charging unit concentrations, even at high pH the polymer cannot dissolve evident by the turbid solution, while at 5:1 the solution becomes clear indicating solubility. At a ratio of 5:1 (azobenzene to charging unit), the polymer can be readily dissolved upon adjusting the pH to ~8-9, while at neutral or acidic pH values it remains insoluble. A simple radical polymerization reaction with a yield of ~50% can reproducibly generate this material. Once dissolved, the polymer can be electroplated onto the positive electrode from methanol with application bias in the rage of 5 to 10 V on a variety of conductive electrodes. The process proceeds by the ionized carboxyl groups causing the polymer to migrate to the anode, where a surplus of cations causes a pH change and the polymer becomes insoluble thus forming a solid-state coating (FIG. 11C). The charged polymer in basic solution migrates in response to an electric field and deposits on the positive electrode where protons are generated thus enabling a pH drop.

Figures 12A, 12B:
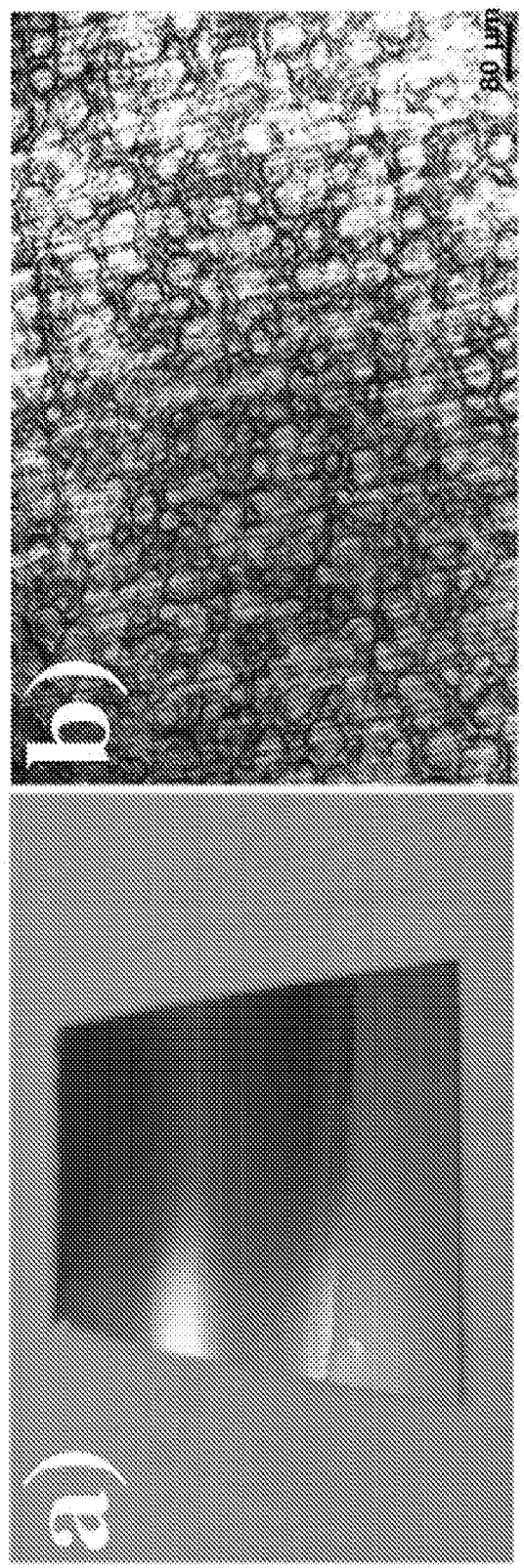
FIGS. 12A-12F show optical microscopy of solid-state films.
Figure 12D:
Figure 12C:
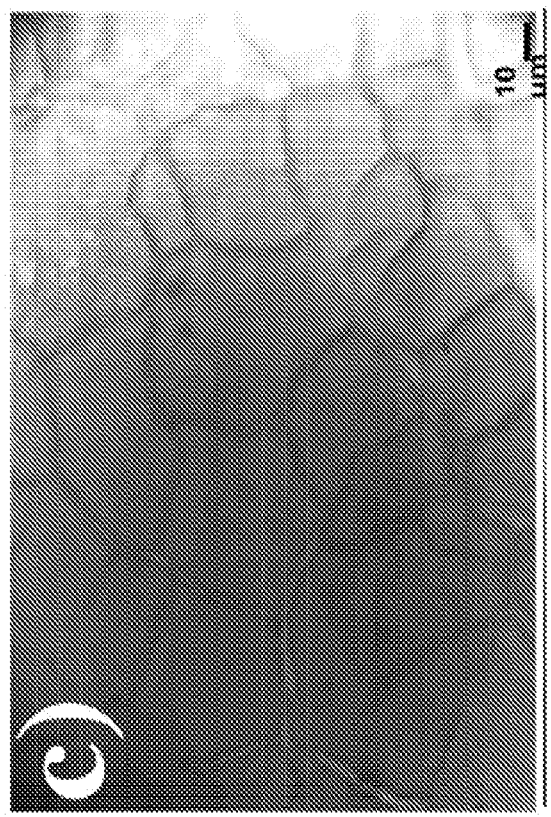
Figures 12E, 12F:
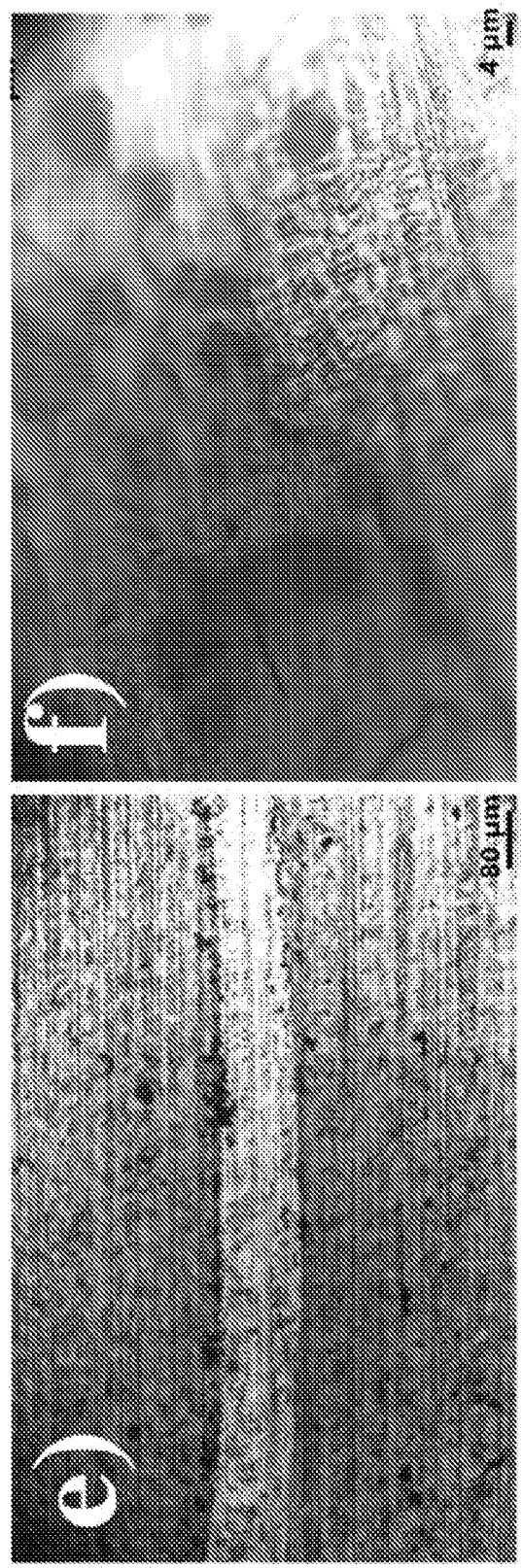

Solid-state coatings were fabricated using the EPD process on stainless steel electrodes with the application of bias at timescales of 1-10 minutes. Optimized films on the order of 500-1000 nm in thickness were achieved and a sample film is shown in FIG. 12A. The film makes a uniform reflective, semi-transparent yellow coating on the submerged (active) area of the electrode. However, this cannot be readily achieved from utilizing the as-prepared methanol-polymer solution, as instead of uniform films, the resultant coating exhibits patchy and disconnected regions (FIG. 12B). A small (~0.25% by vol.) amount of $H_2O$ is required to enable water-splitting at the anode that generates protons and forces the pH drop. Similarly, poor film morphology results if extended periods of time are used for deposition, as the film begins to form cracks and disconnected regions upon drying, though the individual regions exhibited uniformity (FIG. 12C). Microscope images show the interface regions between coated and uncoated portions of the film at the edge of the submerged portion (FIG. 12D), where careful optimization results in a continuous coating. At the interface, an intentional scratch has been made in the film (FIG. 12E). Evidently, at these low optical magnifications the film is uniform and continuous. Higher magnification at the scratch interface further exhibits the film existing as a uniform and connected layer (FIG. 12F).

Figure 13A:
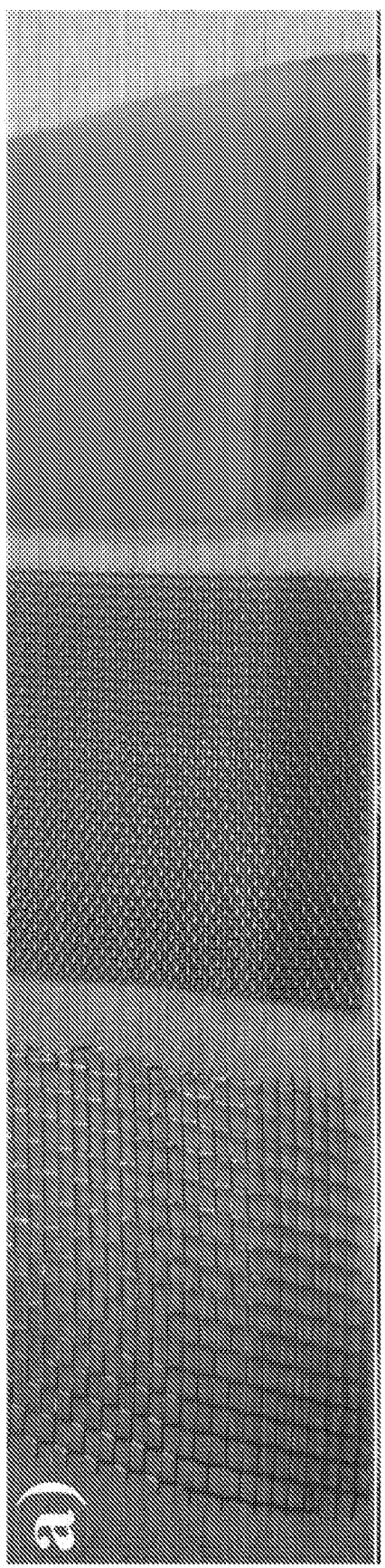
FIGS. 13A-13C show deposition on three-dimensional structures.
Figures 13B, 13C:
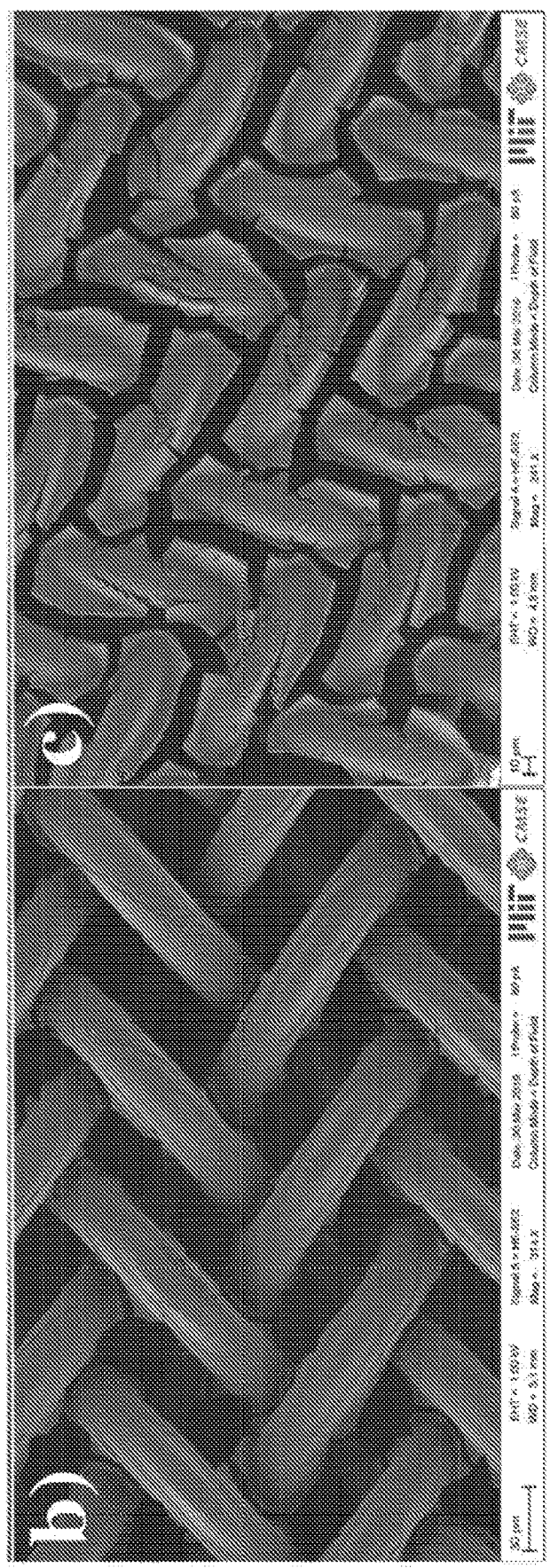

EPD offers the unique advantage of conformal deposition as the electric field is applied through the active electrode area. In this respect EPD has often been a popular choice for nanostructuring where high aspect ratios are needed, such as in nanowire solar cell designs. See Chappaz-Gillot, C.; Berson, S.; Salazar, R.; Lechêne, B.; Aldakov, D.; Delaye, V.; Guillerez, S.; Ivanova, V. Polymer Solar Cells with Electrodeposited CuSCN Nanowires as New Efficient Hole Transporting Layer. *Sol. Energy Mater. Sol. Cells* 2014, 120, Part A, 163-167, and Musselman, K. P.; Wisnet, A.; Iza, D. C.; Hesse, H. C.; Scheu, C.; MacManus-Driscoll, J. L.; Schmidt-Mende, L. Strong Efficiency Improvements in Ultra-Low-Cost Inorganic Nanowire Solar Cells. *Adv. Mater.* 2010, 22 (35), E254-E258, each of which is incorporated by reference in its entirety. To further probe the EPD polymer approach, the material was deposited on a series of stainless steel meshes of varying wire thickness (FIGS. 13A-13C). FIG. 13A shows that the EPD approach can coat the active area effectively as evident from the color contrast with the uncoated portions (250 to 25 micron wire thickness). In order to ascertain whether the coating was conformal, scanning electron microscopy was performed. At a low deposition time (3 minutes) and using the finest mesh (25 micron wire), the deposition was conformal and coated the mesh evenly as evident from FIG. 13B. Extending the deposition time (8 min) further resulted in delamination of the coatings, however the conformity to the shape of the mesh was retained (FIG. 13C). Crack formation and delamination occurs for thicker coatings, similar to FIG. 12C (>10 minutes at 5V), where film forms cracks upon drying. Evidently, this materials platform enables deposition on three-dimensional geometries that may become quite useful for nanoscopic and microscopic devices that utilize STF as well as larger macroscopic solid-state devices.

The polymer EPD approach enables integrating STFs into solid-state devices where large area and tunable thickness are achievable by simple manipulation of the deposition parameter space. Furthermore, a variety of geometries can be utilized depending on the application, which enables to envision some microscopic devices such as heat-triggered degradable electronics and drug delivery. See Park, C. W.; Kang, S.-K.; Hernandez, H. L.; Kaitz, J. A.; Wie, D. S.; Shin, J.; Lee, O. P.; Sottos, N. R.; Moore, J. S.; Rogers, J. A.; White, S. R. Thermally Triggered Degradation of Transient Electronic Devices. *Adv. Mater.* 2015, 27 (25), 3783-3788, and Dicheva, B. M.; Hagen, T. L. M. ten; Li, L.; Schipper, D.; Seynhaeve, A. L. B.; Rhoon, G. C. van; Eggermont, A. M. M.; Lindner, L. H.; Koning, G. A. Cationic Thermosensitive Liposomes: A Novel Dual Targeted Heat-Triggered Drug Delivery Approach for Endothelial and Tumor Cells. *Nano Lett.* 2013, 13 (6), 2324-2331, each of which is incorporated by reference in its entirety. On the macroscale it enables combining STFs with fine metallic structures, such as wires, to enables solar thermal fibers (STFibs) that can leverage the high thermal conductance of metals for heat delivery and management. This greatly expands the opportunity space for integrating STFs into functional devices. More broadly, this type of co-polymer EPD approach for small molecules represents a systematic way of controlled and conformal electroplating of functional materials onto a variety of substrates and form factors.

Figures 14A, 14B:
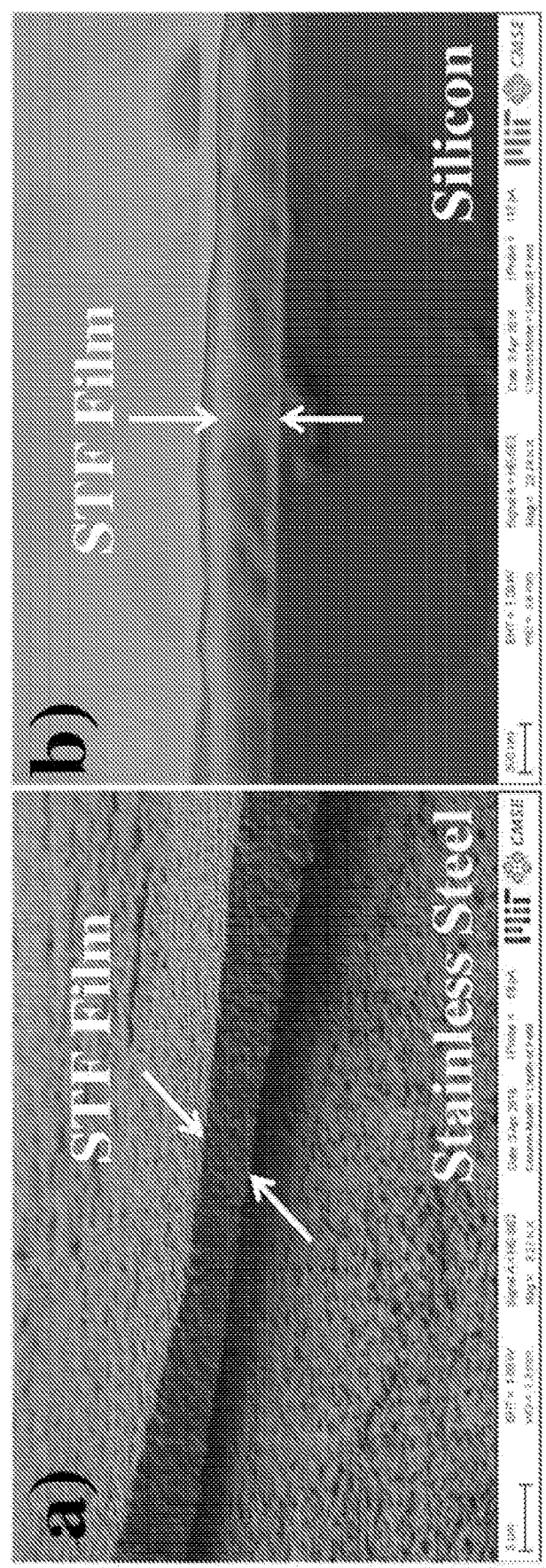
FIGS. 14A-14D show film uniformity and applications.

In order to show the applicability of the materials across various substrates and lengthscales for device applications, cross-sectional samples were investigated to ascertain film smoothness and uniformity. FIG. 14A shows a cross-section region on a stainless-steel electrode, where a film uniform in thickness is shown, as well as having uniform morphology. The film is on the order of a few microns, and forms an independent layer as seen slightly lifting off the substrate. It is worth noting that the surface of the stainless steel has a roughness of several hundred nanometers to a micron, thus the morphology may be improved with a smooth substrate. N-doped crystalline silicon was used as the electrode, exhibiting exceptionally low roughness (<1 nm), where an SEM image (FIG. 14B) depicts a much more uniform film with a thickness of ~350 nm. Longer deposition times and higher voltages were necessary compared to stainless steel in order to deposit a thick layer atop of silicon, likely owing to the lower electrode conductivity of the latter.

Figure 14D:
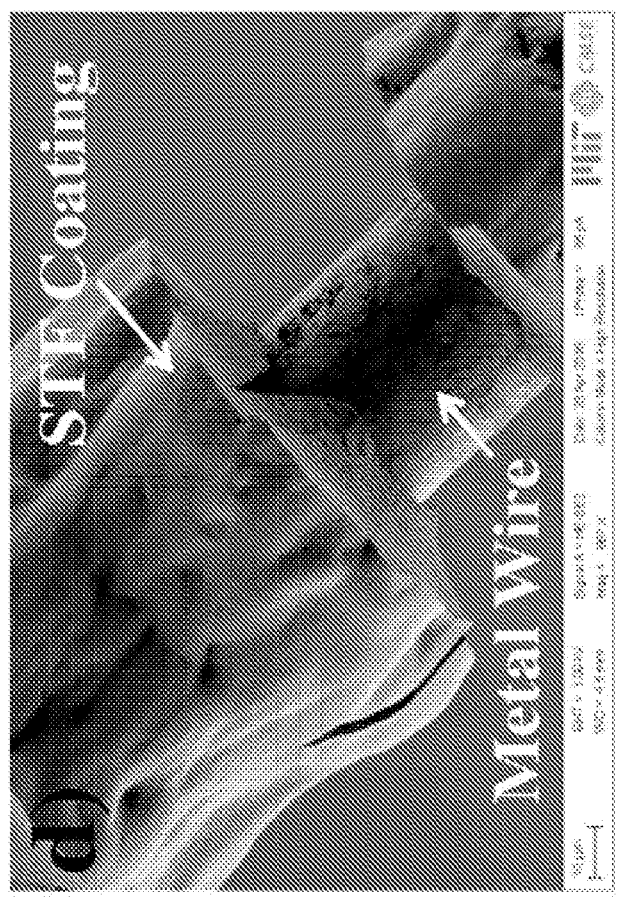
Figure 14C:
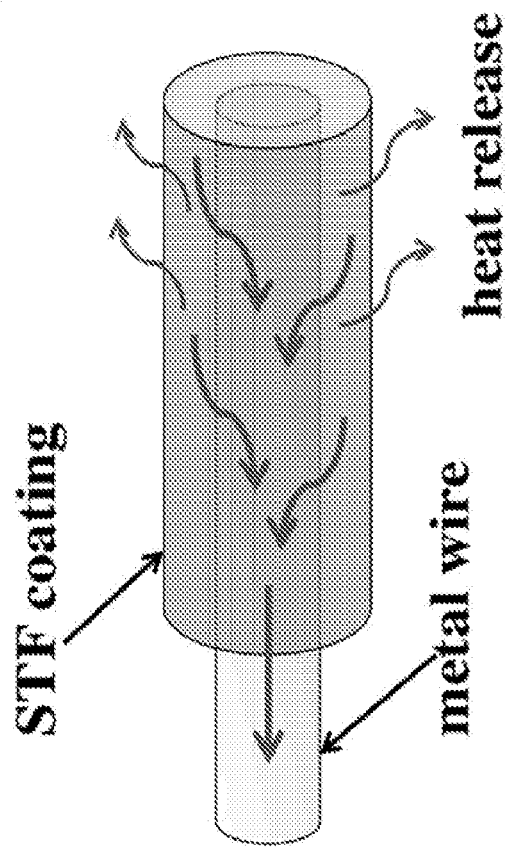

Based on the analysis of the polymer EPD and the resultant coatings, it is possible to propose a potential application in the form of a STFib, where a thin (~50 micron) metal wire is coated with the STF material and integrated into fabrics. Seeing as the STF polymer itself has a low thermal conductivity (<1 W mK$^{-1}$), combination with high thermal conductivity metals (up to 400 W mk$^{-1}$ for copper) can allow for efficient transport of heat to other parts of the fabric or device, as the active area exposed to photon radiation and the region that requires heat may not necessarily be overlapping. The STF would charge with UV radiation, and then when triggered would release heat into the wire that would enable other portions of the device or fabric to be heated (FIG. 14C). FIG. 14D depicts such a wire (~50 microns) where an STF coating has been deposited as a proof-of-concept for such an STFib. The solid-state STF polymer has enhanced lifetime for the cis state. The deposition conditions were optimized to achieve thick coatings (on the same order of the wire thickness), but similar to FIG. 12C, at higher thicknesses there is greater film shrinkage during drying and cracks and deformities may be introduced. Engineering higher molecular weight polymers or adding binders may serve as a remedy for the optimization of such fiber materials.

Figure 15A:
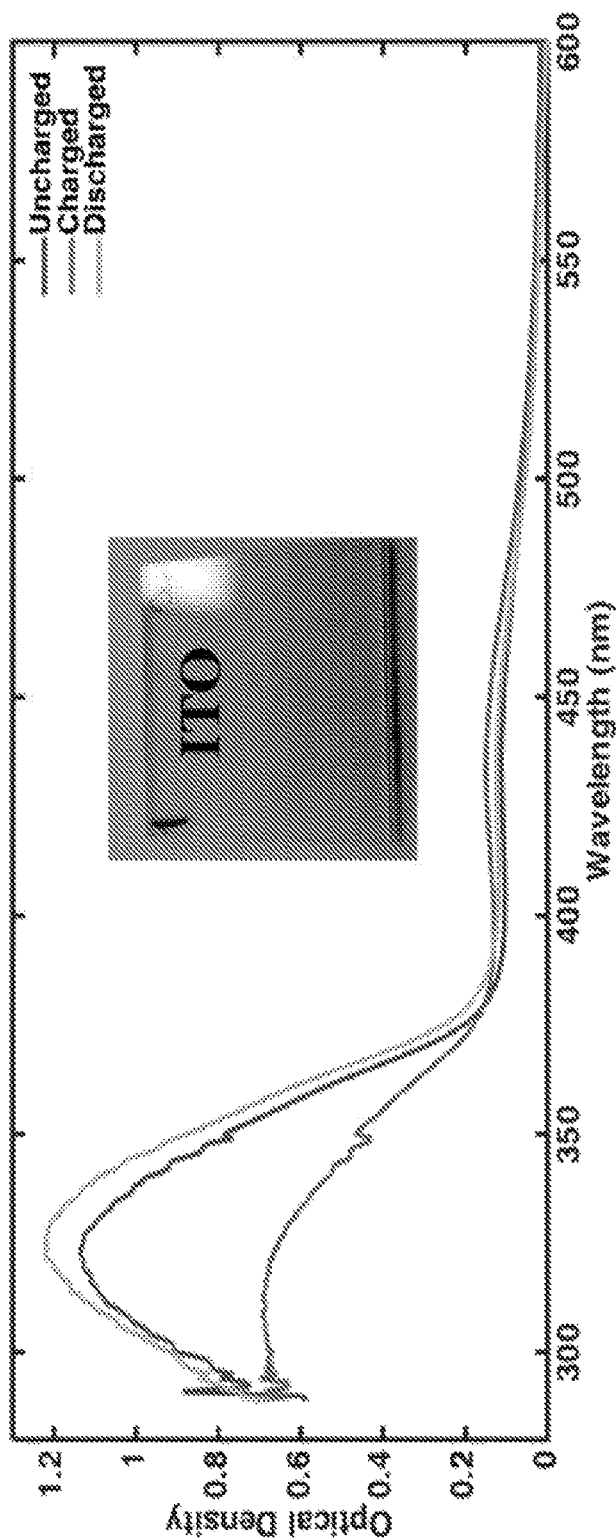
FIGS. 15A-15B show optical and thermal response of the solar thermal fuel copolymer.
Figure 15B:
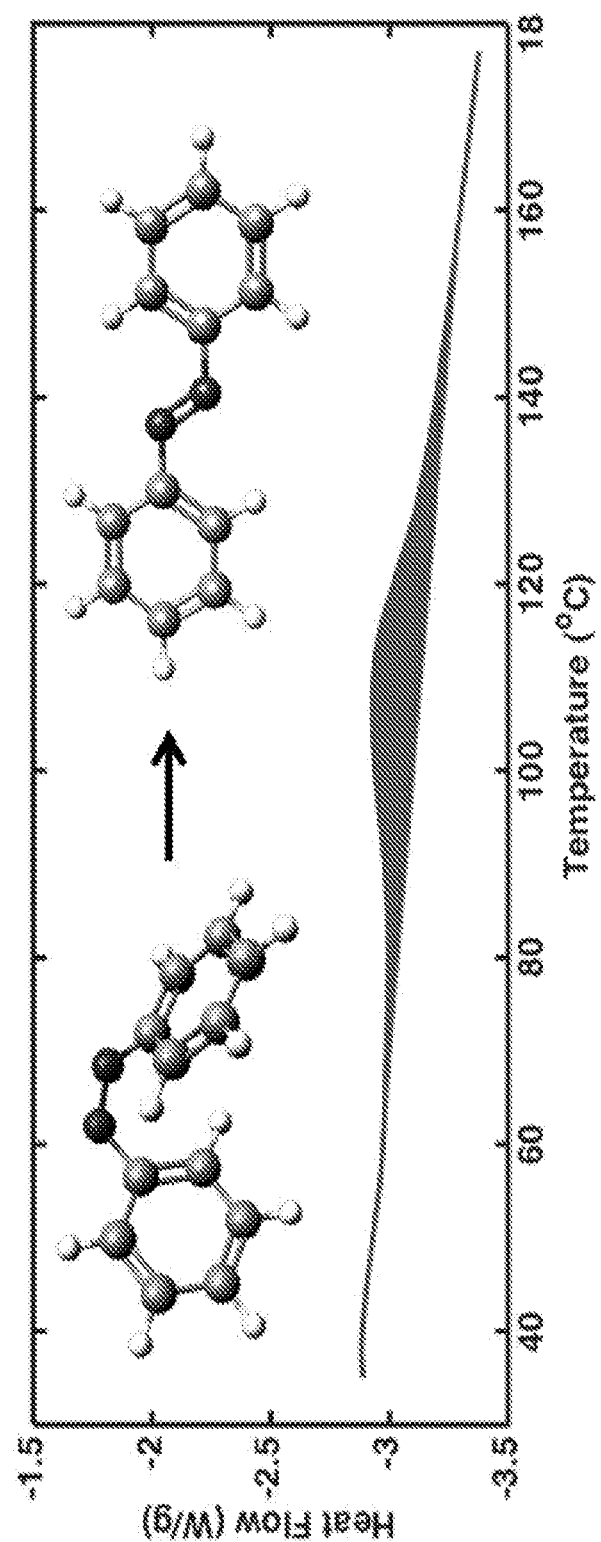

A homopolymer comprised of azobenzene units has an energy density of ~100 J g$^{-1}$. See Zhitomirsky, D.; Cho, E.; Grossman, J. C. Solid-State Solar Thermal Fuels for Heat Release Applications. *Adv. Energy Mater.* 2016, 6 (6), which is incorporated by reference in its entirety. Employing co-polymers has impact on STF performance. To impart novel functionality, the charging units that in turn add non-productive mass was incorporated to the system from an energy storage point of view. For the polymer with 5:1 ratio, this represents an 8% reduction in the potential energy density. In effect, instead of the much greater compromises associated with modifying the azobenzene molecule itself, a small compromise can offer a robust and scalable platform to impart new properties to the materials. To ascertain whether the STF properties are preserved, optical and thermal studies were performed on the STF co-polymer (FIGS. 15A-15B). The EPD process results in a semi-transparent yellow film on indium-doped tin oxide (FIG. 15A inset), and it readily photo-switches and reverts to its original state in solid-state as evident by the change in magnitude of the π->π* (~325 nm) transition in the absorption spectrum. Response after charging shown in red, where the peak magnitude decreases due to an increase in the cis fraction and a decrease in the trans. Discharging the film results in the recovery of the initial peak due to restoration of the trans population. Differential Scanning calorimetry measurements (FIG. 15B) reveal that the energy density is well retained, which is consistent based on the quantity of charging unit employed per unit of azobenzene. A heat release corresponding to a gravimetric energy density of 90 J g$^{-1}$ is observed. Evidently, an energy storing STF co-polymer film achieved via electrodeposition shows incorporation of new functionality into STF materials with minimal compromises.

This approach enables electrodeposition of STF materials, but it may be applied to a broader suite of functional molecules. In other fields, such as photon upconversion, there has been a recent push to extend the capabilities of solid-state photon upconverting thin-films for device applications. See Monguzzi, A.; Mauri, M.; Bianchi, A.; Dibbanti, M. K.; Simonutti, R.; Meinardi, F. Solid-State Sensitized Upconversion in Polyacrylate Elastomers. *J. Phys. Chem. C* 2016, 120 (5), 2609-2614, and Wu, M.; Congreve, D. N.; Wilson, M. W. B.; Jean, J.; Geva, N.; Welborn, M.; Van Voorhis, T.; Bulović, V.; Bawendi, M. G.; Baldo, M. A. Solid-State Infrared-to-Visible Upconversion Sensitized by Colloidal Nanocrystals. *Nat Photon* 2016, 10 (1), 31-34, each of which is incorporated by reference in its entirety. So much so, that a similar approach was taken in introducing pendant emitter and sensitizer moieties onto a polymer backbone (see Lee, S. H.; Ayer, M. A.; Vadrucci, R.; Weder, C.; Simon, Y. C. Light Upconversion by Triplet-Triplet Annihilation in Diphenylanthracene-Based Copolymers. *Polym. Chem.* 2014, 5 (24), 6898-6904, which is incorporated by reference in its entirety), where now the potential addition of a charging unit can similarly predispose the polymer for EPD, enabling the same processing benefits.

In summary, this method enables superior retention of solar thermal fuel properties, with energy densities of ~90 J/g, chargeability in the solid-state, and exceptional materials utilization compared to other solid-state processing approaches. EPD offers an exciting avenue for deposition of STFs onto a variety of substrates and form factors to give rise for various applications. Additionally, EPD allows for controllable deposition over large areas and with tunable thickness, and greatly enhances the materials utilization efficiency; however, modification of the STF molecules themselves often comes at a large compromise to their energy storage properties. The co-polymer STF approach is a robust and precise way of enhancing the STF functionality for solid-state applications without major compromises to the energy density. Additional functional groups and molecules may easily be incorporated into the material while minimally affecting the STF energy storage functionality. Beyond charging units for EPD, moieties may be included to enable cross-linking to form freestanding films, broader solar absorption, and enhanced energy density through side-chain interactions. See Kolpak, A. M.; Grossman, J. C. Hybrid Chromophore/template Nanostructures: A Customizable Platform Material for Solar Energy Storage and Conversion. *J. Chem. Phys.* 2013, 138 (3), 034303, which is incorporated by reference in its entirety. Together with the EPD approach, the co-polymer can conformally deposit onto three-dimensional architectures, enables smooth and uniform film morphology, and enables new applications such as STFibs that may be employed in fabrics or other solid-state devices with specific requirements on heat storage and transport. Beyond STFs, the co-polymer EPD approach potentially enables fabrication of solid-state films with any functional small-molecule and represents a broad spectrum of opportunities for solid-state devices and for industrial and consumer applications. This approach is applicable to systems such as photon upconversion, photovoltaics, photosensing, light emission, and beyond, where small functional molecules enable solid-state applications.

EXAMPLES

Density Functional Theory:

Standard ab-initio calculations was performed within the DFT framework, using the Vienna Ab Initio Simulation Package (VASP, v5.3). Plane-wave and projectoraugmented-wave (PAW) type pseudopotentials with kinetic-energy cut-offs of up to 400 eV were employed, along with the PBE exchange-correlation functional.

Monomer Synthesis:

The monomer was synthesized based on a published recipe. See M. Moniruzzaman, C. J. Sabey, G. F. Fernando, *Macromolecules* 2004, 37, 2572, which is incorporated by reference in its entirety. Briefly, 2 g of phenolazophenol where dissolved in 25 mL of THF and 1.4 mL of triethylamine in anhydrous and oxygen free conditions. 3 mL of methacryloyl chloride was added drop-wise under inert conditions, while cooling reaction in an ice bath (resulting in gas evolution, dark color change, and salt precipitate). The reaction was left stirring at room temperature for 48 hours. Extraction was done by diluting four times with 3:1 mix of DCM (or chloroform) and water. The organic phase was dried with sodium sulphate and dried under vacuum (<0.1 mbar) overnight. The resultant material was purified in a silica column using 1:1 DCM:Hexanes. Overall reaction yield between 70-80%.

Polymer Synthesis:

In a typical homopolymerization, 0.1 g of monomer was dissolved in 1 mL of anhydrous THF and 3 mg of AIBN was added. The solution was subjected to 3 freeze/pump/thaw cycles. The reaction was run under inert conditions at 65° C. for 3 hours. The polymer was isolated in a solution of stirred methanol, and then filtered and rinsed with additional methanol. The reaction is easily scaled to 1 g. Maximum yields obtained were 80%.

In a typical co-polymerization, the STF monomer and charging unit (4-vinylbenzoic acid) were combined at a 5:1 ratio, based 100 mg of monomer. This combination was dissolved in anhydrous THF (1 mL) and AIBN (3 mg) was added. The solution was subjected to 3 freeze/pump/thaw cycles. The reaction was run under inert conditions at 65° C. for 3 hours. The polymer was isolated in a solution of stirred methanol, and then filtered and rinsed with additional methanol. The reaction is easily scaled to 1 g. Maximum yields obtained were 50%.

Size Exclusion Chromatography:

Size exclusion chromatography (SEC) measurements were performed on 0.5 mg/ml samples in stabilized, HPLC-grade tetrahydrofuran using an Agilent 1260 Infinity system with variable-wavelength diode array (254, 450, and 530 nm) and refractive index detectors, guard column (Agilent PLgel; 5 μm; 50×7.5 mm), and three analytical columns (Agilent PLgel; 5 μm; 300×7.5 mm; 105, 104, and 103 Å pore sizes). The instrument was calibrated with narrow-dispersity polystyrene standards between 1.7 and 3150 kg/mol. All runs were performed at 1.0 mL/min flow rate and 35° C. Molecular weight values are calculated using Chemstation GPC Data Analysis Software (Rev. B.01.01) based on the refractive index signal.

UV-Vis Measurements:

Absorption was carried out using a Cary 5000, with 100 μm concentrations in a 10 cm pathlength quartz cuvette. Solid-state measurements were carried out on quartz substrates. Charging in-situ was done using a high power UV lamp, while cycling was done by optical charging and discharging using an arc lamp and filters to excite the $\pi>\pi^*$ and $n>\pi^*$ transitions of the trans and cis isomer respectively.

For azobenzene based STF, absorption was carried out using a Cary 5000 on films deposited on ITO substrates. Sample charging was done using a high power UV lamp at a distance of 10 cm (100 W). Discharging of films was carried out via heating at 130° C.

Image Acquisition:

Film photographs were obtained using a conventional optical microscope. High magnification images and cross-sections were obtained using a Zeiss Merlin scanning electron microscope by depositing materials on a single crystal silicon substrate. The settings for the azobenzene-based films were typically 1-2 keV and ~100 pA, working distance of 3-4 mm.

Solid-State Film Preparation:

Spin coating was carried out at 1000 rpm on 1" quartz substrates. Films were dried overnight in air ambient conditions. Cross-linked films were made by dissolving the polymer in polyglycol diacrylate (n=250) under inert conditions and using a 2,2-dimethoxy-2-phenylacetophenone photoinitiator. A UV lamp (3 W) was used to cross-link the film. Thickness measurements were obtained using a Dek-Tak 6.

Charging and Differential Scanning Calorimetry:

Solution samples in toluene were charged using a 365 nm 100 W UV lamp while cooled at 25° C. while stirring. Solid-state samples were kept at 30° C. using a cooling stage while charged using the 100 W lamp at a distance of 10 cm. Films were subsequently redissolved in DCM or toluene (solvent had no impact on DSC energy density values). The solutions were dried in DSC pans in the dark and sealed, giving a final mass of 1 mg of material. DSC was carried out using a TA Instruments DSC Q20.

For azobenzene based STF, films were subsequently redissolved in acetone for sample preparation for calorimetry. The solutions were dried in differential scanning calorimetry (DSC) pans in the dark and sealed, giving a final mass of 1~mg of material. DSC was carried out using a TA Instruments DSC Q20.

Macroscopic Heat Release:

100 mg of polymer was charged in a large flask while being cooled to 10° C. first in toluene for 16 hours, and then transferred to acetone and charge overnight. The charged material was dried using vacuum to a volume of 1 mL, and then drop cast in several steps with a 30 min vacuuming step in between. A final vacuum (1 mbar) was applied for 6 hours before discharge. Discharging was done relative to an uncharged control on a hot plate while monitoring with an infrared camera (FLIR Ax5).

Electrodeposition:

20 mg of polymer were combined with 40 ml of methanol to give a concentration of 0.5 mg ml$^{-1}$. A concentrated (pH~14) solution of KOH in methanol was used to adjust the pH of the polymer solution to between 8 and 9. A small amount of dionized water (100 microliters) was added to enable continuous films. Stainless steel electrodes were cut from Corrosion Resistant 316 Stainless Steel foil 004" in thickness. The electrodes were placed opposite each other at a separation of 2 cm, with an immerse area of ~3.2 cm². A constant voltage power supply was used to apply voltages up to 10 V. The best planar films were obtained at 5 V with deposition time of 3 minutes, with current densities approximately 0.1-0.3 mA cm$^{-2}$. Corrosion-Resistant 304 Stainless Steel Woven Wire Cloth 400×400 Mesh, 0.001' Wire, 40×40 Mesh, 0.01" Wire and 15×15 Mesh, 0.01" Wire were used for depositing on three dimensional geometries with similar deposition parameters. 0.002" wire was used for constructing the STFibs, though deposition times need to be reduced to 1 to 2 minutes to prevent overly thick deposits.

UV-Vis Measurements of Solid-State Films:

Absorption was carried out using a Cary 5000 on films deposited on ITO substrates. Sample charging was done using a high power UV lamp at a distance of 10 cm (100 W). Discharging of films was carried out via heating at 130° C. Image acquisition: Film photographs were obtained using a conventional optical microscope. High magnification images and cross-sections were obtained using a Zeiss Merlin scanning electron microscope with the settings show in the figures (typically 1-2 keV and ~100 pA, working distance of 3-4 mm).

Charging and Differential Scanning Calorimetry:

Solution samples in acetone were charged using a 365 nm 100 W UV lamp while cooled at 25° C. while stirring. Solid-state samples were kept at 30° C. using a cooling stage while charged using the 100 W lamp at a distance of 10 cm. Films were subsequently redissolved in acetone for sample preparation for calorimetry. The solutions were dried in differential scanning calorimetry (DSC) pans in the dark and sealed, giving a final mass of 1~mg of material. DSC was carried out using a TA Instruments DSC Q20.

Other embodiments are within the scope of the following claims.

What is claimed is:

1. An energy storage device comprising a solar thermal fuel including one of more layers of a plurality of photoswitchable moieties associated with a first polymer, wherein the plurality of photoswitchable moieties include a plurality of azobenzene moieties, a plurality of stilbene moieties, a plurality of norbornadiene moieties, or a plurality of spiropyran moieties, wherein the first polymer is a polystyrene or a polyolefin and wherein the energy storage device is in solid state.

2. The energy storage device of claim 1, wherein the plurality of photoswitchable moieties are covalently linked to first polymer.

3. The energy storage device of claim 1, wherein the first polymer is polystyrene.

4. The energy storage device of claim 1, wherein the plurality of azobenzene moieties have formula (I):

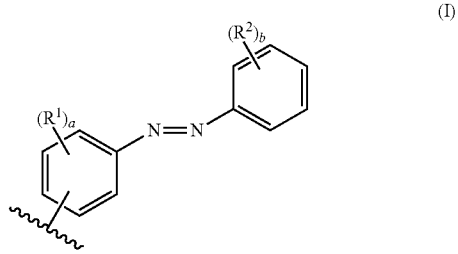

(I)

wherein:
each R$^1$, independently, is H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)— cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

each R$^2$, independently, is H, halo, hydroxy, nitro, cyano, amino, alkylamino, dialkylamino, —SO$_3$H, alkyl, alkenyl, cycloalkyl, cycloalkenyl, alkoxy, cycloalkoxy, heterocyclyl, aryl, heteroaryl, heterocyclylalkyl, arylalkyl, heteroarylalkyl, —C(O)-alkyl, —C(O)-alkenyl, —C(O)— cycloalkyl, —C(O)-cycloalkenyl, —C(O)-alkoxy, —C(O)-cycloalkoxy, —C(O)-heterocyclyl, —C(O)-aryl, —C(O)-heteroaryl, —C(O)-heterocyclylalkyl, —C(O)-arylalkyl, or —C(O)-heteroarylalkyl;

a is 0, 1, 2, 3 or 4;
b is 0, 1, 2, 3, 4, or 5; and

|- represents an optional covalent link to the first polymer.

5. The energy storage device of claim 1, wherein the photoswitchable moieties are converted from a lower-energy state to a higher-energy metastable state upon UV illumination.

6. The energy storage device of claim 1, wherein the photoswitchable moieties are reverted from a higher-energy metastable state to a lower-energy state by a trigger.

7. The energy storage device of claim 6, wherein reverting from a higher-energy state to a lower-energy metastable state upon an external trigger induces heat release.

8. The energy storage device of claim 7, wherein reverting from a higher-energy state to a lower-energy metastable state includes isomerization of the photoswitchable moieties.

9. The energy storage device of claim 1, wherein the first polymer is incorporated into a second polymer matrix.

10. An energy storage device comprising a solar thermal fuel including one of more layers of a plurality of photoswitchable moieties associated with a first polymer, wherein the plurality of photoswitchable moieties include a plurality of azobenzene moieties, a plurality of stilbene moieties, a plurality of norbornadiene moieties, or a plurality of spiropyran moieties, wherein the energy storage device is in solid state, wherein the first polymer is incorporated into a second polymer matrix and wherein the first polymer and the second polymer are crosslinked.

11. The energy storage device of claim 9, wherein the second polymer includes acrylate.

12. The energy storage device of claim 1, wherein the thickness of the one or more layers is between 100 nm and 100 μm.

13. The energy storage device of claim 1, wherein the photoswitchable moieties are functionalized.

14. The energy storage device of claim 1, wherein a plurality of ionizable moieties are associated with the first polymer.

15. The energy storage device of claim 14, wherein the ionizable moieties includes carboxyl groups.

16. The energy storage device of claim 1, further comprising a substrate, wherein the substrate is coated with the solar thermal fuel.

17. The energy storage device of claim 16, wherein the substrate includes a conducting material.

18. The energy storage device of claim 16, wherein the substrate includes a metal wire.

19. The energy storage device of claim 18, wherein the metal wire is incorporated into a fabric.

20. The energy storage device of claim 16, wherein the substrate includes indium tin oxide.

21. The energy storage device of claim 1, wherein the solar thermal fuel further includes a binder.

22. A method of storing cyclable energy comprising:
providing an energy storage device comprising a solar thermal fuel including a plurality of photoswitchable moieties associated with a first polymer, wherein the plurality of photoswitchable moieties include a plurality of azobenzene moieties, a plurality of stilbene moieties, a plurality of norbornadiene moieties, or a plurality of spiropyran moieties, wherein the first polymer is a polystyrene or a polyolefin and wherein the energy storage device is in solid state;
illuminating the plurality of photoswitchable moieties, thereby converting the photoswitchable moieties to from a lower-energy state to a higher-energy metastable state;
storing the plurality of photoswitchable moieties in the higher-energy metastable state for a period of time; and
providing a trigger to cause the plurality of photoswitchable moieties to revert to the lower-energy state.

23. The method of claim 22, further comprising releasing heat.

24. The method of claim 22, wherein converting the photoswitchable moieties to from a lower-energy state to a higher-energy metastable state includes isomerization of the photoswitchable moieties.

25. A method of manufacturing an energy storage device comprising:
providing a substrate;
depositing a layer of a first polymer solution on the substrate, a plurality of photoswitchable moieties associated with the first polymer, wherein the plurality of photoswitchable moieties include a plurality of azobenzene moieties, a plurality of stilbene moieties, a plurality of norbornadiene moieties, or a plurality of spiropyran moieties, wherein the first polymer is a polystyrene or a polyolefin; and
solidifying the layer.

26. The method of claim 25, further comprising repeating depositing a layer of a first polymer solution on the substrate, a plurality of photoswitchable moieties associated with the first polymer and solidifying the layer.

27. The method of claim 25, further comprising charging the device with UV illumination.

28. The method of claim 25, wherein solidifying includes UV curing.

29. The method of claim 25, wherein the first polymer solution further includes a second polymer, wherein the first polymer and the second polymer form crosslinks upon UV illumination.

30. The method of claim 25, wherein depositing includes tape-casting, drop-casting or spin-coating.

31. The method of claim 25, wherein depositing includes electrodeposition.

32. The method of claim 31, wherein the first solution is dissolved in an electrolyte.

33. The method of claim 32, wherein the first solution further includes water.

* * * * *